United States Patent
Jacobsen et al.

(10) Patent No.: US 8,050,203 B2
(45) Date of Patent: Nov. 1, 2011

(54) MULTI-CHANNEL DIGITAL WIRELESS AUDIO SYSTEM

(75) Inventors: Phillip Jacobsen, Sherwood Park (CA); John Sobota, Edmonton (CA); Ryan Northcott, Edmonton (CA); Jim Qualie, Edmonton (CA); Patrick Fisher, Edmonton (CA); Jason Gosior, St. Albert (CA)

(73) Assignee: Eleven Engineering Inc.

( * ) Notice: Subject to any disclaimer, the term of this patent is extended or adjusted under 35 U.S.C. 154(b) by 1625 days.

(21) Appl. No.: 11/311,245

(22) Filed: Dec. 20, 2005

(65) Prior Publication Data
US 2006/0153155 A1    Jul. 13, 2006

Related U.S. Application Data

(60) Provisional application No. 60/637,772, filed on Dec. 22, 2004.

(51) Int. Cl.
*H04B 7/00* (2006.01)
(52) U.S. Cl. .................................. 370/310; 370/465
(58) Field of Classification Search .................. None
See application file for complete search history.

(56) References Cited

U.S. PATENT DOCUMENTS

| | | | |
|---|---|---|---|
| 5,299,264 A | 3/1994 | Schotz et al. | |
| 5,491,839 A | 2/1996 | Schotz | |
| 5,581,617 A | 12/1996 | Schotz et al. | |
| 5,832,024 A | 11/1998 | Schotz et al. | |
| 5,946,343 A | 8/1999 | Schotz et al. | |
| 6,064,699 A | 5/2000 | Law | |
| 6,088,360 A * | 7/2000 | Amaral et al. | 370/412 |
| 6,337,913 B1 | 1/2002 | Chang | |
| 6,381,314 B1 * | 4/2002 | Walinski | 379/101.01 |
| 6,466,832 B1 | 10/2002 | Zuqert et al. | |
| 6,608,907 B1 | 8/2003 | Lee | |
| 6,658,115 B1 | 12/2003 | Lam | |
| 6,684,060 B1 | 1/2004 | Curtin | |
| 6,741,708 B1 | 5/2004 | Nakatsugawa | |
| 6,859,135 B1 * | 2/2005 | Elliott | 340/7.36 |
| 6,970,526 B2 * | 11/2005 | Min | 375/354 |
| 2001/0044277 A1 | 11/2001 | Kremsl et al. | |
| 2003/0056199 A1 * | 3/2003 | Li et al. | 717/127 |
| 2003/0123409 A1 * | 7/2003 | Kwak et al. | 370/335 |
| 2003/0137939 A1 * | 7/2003 | Dunning et al. | 370/235 |
| 2003/0142839 A1 | 7/2003 | Jones et al. | |
| 2004/0156335 A1 * | 8/2004 | Brethour et al. | 370/329 |
| 2005/0135309 A1 * | 6/2005 | Hester et al. | 370/331 |
| 2005/0160345 A1 * | 7/2005 | Walsh et al. | 714/776 |
| 2005/0188102 A1 * | 8/2005 | Madajczak | 709/238 |
| 2006/0094442 A1 * | 5/2006 | Kirkup et al. | 455/455 |
| 2008/0107095 A1 * | 5/2008 | Black et al. | 370/342 |
| 2008/0212582 A1 * | 9/2008 | Zwart et al. | 370/390 |
| 2009/0310586 A1 * | 12/2009 | Shatti | 370/338 |

FOREIGN PATENT DOCUMENTS

| | | |
|---|---|---|
| WO | WO-99/18761 | 4/1999 |
| WO | WO-2004/004178 A1 | 1/2004 |

* cited by examiner

*Primary Examiner* — Kevin C Harper

(57) ABSTRACT

In a multi-channel digital wireless audio system with at least one transmit node and at least one receive node, each node can both receive and transmit digital audio signals. Signals sent from a receive node to a transmit node may acknowledge satisfactory signal receipt, or may requesting retransmission of data packets received in a corrupted state. Original and retransmitted signals may be sent in compressed form to enable use of narrow-band digital radios. The system preferably incorporates a dual control channel to enable transmission of meta data. Each system node preferably incorporates a hardware-multithreaded processor adapted to implement various functions such as baseband functions, RF protocol functions, error correction functions, and audio processing functions, with each independent thread being adapted to implement a different functional block.

55 Claims, 11 Drawing Sheets

MULTI-CHANNEL DIGITAL WIRELESS AUDIO SYSTEM

CROSS-REFERENCE TO RELATED APPLICATIONS

This application claims the benefit, pursuant to 35 U.S.C. 119(e), of U.S. Provisional Application No. 60/637,772, filed on Dec. 22, 2004, and said provisional application is hereby incorporated herein by reference in its entirety.

FIELD OF THE INVENTION

The present invention relates to wireless audio systems, and in particular to digital wireless audio systems in which system latency is configurable within a selected range.

TERMINOLOGY

Terms, acronyms, and abbreviations appearing in the Glossary section of this patent document are intended to be understood in accordance with the definitions or explanations set out in the Glossary, unless the context clearly requires otherwise. Terms not appearing in the Glossary or otherwise defined in this specification are intended to have the meanings generally understood by persons skilled in the art of the invention.

In this document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

BACKGROUND OF THE INVENTION

A variety of wireless audio systems may be found in the prior art. The following general categories of prior art wireless audio systems are of particular relevance to the present invention, especially as they pertain to creating good quality of service, in the domain of audio information transmission and delivery:

DIGITAL AUDIO—CD audio and techniques for dealing with surface damage on CDs, causing bits to be read incorrectly.

DIGITAL WIRELESS AUDIO—Digital cordless phones are prior art. Digital radios in this application include static channel, FHSS and DSSS.

NETWORK-BASED AUDIO—Audio over Internet techniques (e.g., RealNetworks,® iTunes,™ and various others); Audio over Ethernet; Audio over wireless Ethernet (such as music mover products from Creative, Apple etc.).

ANALOG WIRELESS HI-FI AUDIO—For example, 900 MHz FM (analog) wireless stereo systems (e.g., Recoton,® Sennheiser)

PRO AUDIO—There are specific frequencies available for pro audio (analog FM solutions). These typically overlap with VHF and UHF TV channels, forcing users to determine whether or not there is a conflict in each city. The microphones have 2 FM radio transmitters and the receivers also have 2 radios (and 2 antennas), such that if interference or multipath occurs on one, the audio path continues on the other. Samson, Shure,® and AKG® are examples of companies that sell products in this category.

DIGITAL AUDIO BROADCAST (DAB)—In the UK and increasingly in other countries, the old AM and FM radio is being slowly replaced by DAB stations that transmit high fidelity content over the air in digital form.

SATELLITE RADIO—XM and Sirius are examples of "satellite radio" companies.

DIGITAL AUDIO COMPRESSION—The telephone industry has been using digital audio for decades, and has adopted several simple time-domain compression techniques called μlaw and A-law. These techniques basically apply a table-driven logarithmic representation to the raw data—typically reducing 16-bit samples to 8-bit samples (2 to 1 compression). Digital cordless telephones have applied ADPCM compression to voice audio signals in order to reduce the amount of digital payload.

Pro Audio (FM analog) solutions achieve high quality of service (QoS) by using two transmit frequencies at the receive side, to ensure continuity of signal transmission if one of the frequencies fails (e.g., if a frequency is interfered with or experiences extreme path loss such as with a multipath null). An objective of the present invention is to provide a wireless audio system capable of achieving levels of QoS and frequency diversity comparable to those achievable with Pro Audio, but using digital, frequency-agile radios; i.e., digital wireless audio (DWA). It is a further objective to provide a wireless audio system that does not require multiple radios at each system node, thus reducing system cost compared to known wireless systems.

One aspect of fidelity in multi-channel audio solution is synchronization between channels. For example, without precise synchronization between left and right channels of a stereo signal, the sound image will be grossly distorted.

Another objective is to provide high QoS using busy ISM bands that do not have licensing requirements (such as the 2.400-2.483 GHz band) while coexisting with other signal traffic in the target radio band. This objective makes it desirable to use relatively low-data-rate, narrow-band radios; i.e., having a narrow footprint in the band, such radios are more likely to be able to find "clean" operating frequencies within the band that will not be interfered with by traffic from other devices. The basic rule here is that the fewer bits of payload that are sent, the less exposed the data is in the air, and thus the greater the QoS.

Achieving desirable performance in audio fidelity in a DWA system entails consideration of generally known principles of digital audio. Fidelity can be measured with such metrics as frequency response/pass band ripple, total harmonic distortion, signal-to-noise ratio, and the like. The challenge comes in implementing the general case in which fidelity and QoS must be maintained at or above desired minimum levels while end-to-end system latency is kept to at or below a desired maximum level. There are other global considerations such as system size, cost, and power consumption that typically have hard constraints in practical embodiments. In view of such constraints, it is commonly necessary to make tradeoffs between fidelity, QoS, and latency. There is accordingly a need for new DWA systems having improved fidelity, QoS, and latency characteristics, but without increasing system size, cost, or power consumption compared with known systems of similar performance. The present invention is directed to the foregoing needs and objectives.

BRIEF SUMMARY OF THE INVENTION

In general terms, the invention is a multi-channel digital wireless audio (DWA) system having at least one transmit node and at least one receive node for receiving digital audio signals from the transmit node or nodes. In simpler embodiments, the DWA system may incorporate a single transmit node and a single receive node. In one preferred embodiment, the DWA system incorporates a single transmit node and multiple receive nodes. In another preferred embodiment, the DWA system incorporates multiple transmit nodes and a single receive node.

Each transmit node incorporates a radio frequency (RF) transceiver or, alternatively, an RF transmitter and an RF receiver. Each receive node also incorporates an RF transceiver or, alternatively, an RF transmitter and an RF receiver, such that each receive node can also send digital signals to the transmit node or nodes. Signals sent from a receive node to a transmit node may contain information confirming satisfactory receipt of audio signals from the transmit node or, alternatively, requesting retransmission of data packets that arrived at the receive node in a corrupted state. In preferred embodiments, each transmit node is adapted to compress audio signals transmitted to the receive node or nodes, whether as original transmissions or retransmissions in response to requests from the receive node, and each receive node is adapted to decompress signals from the transmit node. Similarly, each receive node in preferred embodiments is adapted to compress signals sent to the transmit node as described above, and each transmit node is adapted to decompress signals from the receive node.

Preferred embodiments of the invention enable the use of relatively inexpensive, narrow-band digital radios (such as those used in digital cordless telephones) while still achieving high QoS, by utilizing audio compression and decompression techniques to reduce data payload requirements. One embodiment uses a single radio transceiver on each node (to reduced cost and power consumption), while using digital techniques to create fidelity and QoS comparable to or better than the fidelity and QoS achieved by more expensive analog pro audio solutions. This embodiment may be used to implement high QoS to several remote speakers.

Each transmit node and each receive node preferably incorporates a hardware-multithreaded processor adapted to implement various functions such as baseband functions, RF protocol functions, error correction functions, and audio processing functions (including but not limited to compression and decompression functions)—all of which functions are well-known and understood by persons skilled in the art of the invention. A hardware-multithreaded processor with, for example, eight separate hardware threads may be used, with each independent thread being adapted to implement a different functional block.

Accordingly, in a first aspect, the invention is a system for wireless transmission of audio signals, said system comprising a single transmit node and one or more receive nodes, wherein:
(a) the transmit node and each receive node comprises transmitting means adapted for transmitting one or more digital audio signals, and further comprises receiving means for receiving digital audio signals;
(b) each receive node can send requests back to the transmit node requesting retransmission of audio signal packets that have arrived at the receive node in a corrupted state.

In a second aspect the present invention is a system for wireless transmission of audio data, comprising a single receive node and one or more transmit nodes, wherein:
(a) each transmit node comprises one or more radio frequency transceivers adapted to send audio signals in digital form over one or more audio channels, in either compressed or uncompressed form;
(b) the receive node comprises one or more radio frequency transceivers adapted to receive digital audio signals from any selected transmit node;
(c) the receive node can send requests back to any selected transmit node requesting retransmission of audio data packets that have arrived at the receive node from the selected transmit node in a corrupted state; and
(d) a request for retransmission can designate whether the retransmitted data packets are to be in compressed or uncompressed form.

In a third aspect, the invention is a system for wireless transmission of audio signals, comprising a single transmit node and one or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) each receive node can send requests back to the transmit node requesting retransmission of audio signal packets that have arrived at the receive node in a corrupted state;
(d) the system is adapted to concurrently support closed-loop receive nodes and open-loop receive nodes in any combination.

In a preferred embodiment, the system has one or more open-loop receive nodes and one or more closed-loop receive nodes, with the one or more open-loop receive nodes being adapted to utilize packets retransmitted by the transmit node, as requested by the one or more open-loop receive nodes, to replace corrupted packets previously received by the one or more open-loop receive nodes.

In a fourth aspect, the invention is a system for wireless radio transmission of audio signals, said system comprising a single transmit node and one or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) the transmit node is adapted to retransmit previously sent audio data in response to a request from a receive node; and
(d) each of the transmit node and the receive nodes incorporate a single hardware-multithreaded processor having eight or more hardware threads, said processor being adapted to implement baseband functions, protocol functions, error correction functions, and audio processing functions in parallel on each node;
(e) end-to-end audio signal latency may be preset to a desired value, and will remain substantially equal to the preset value during and between operational sessions.

In a fifth aspect, the invention is a system for wireless radio transmission of audio signals, said system comprising a single transmit node and one or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) each receive node can send requests back to the transmit node requesting retransmission of audio signal packets that have arrived at the receive node in a corrupted state;

(d) the transmit node is adapted to compress all audio signals to a desired level prior to transmission or retransmission using time-domain techniques;

(e) a duplex control channel is implemented between the transmit node and one or more of the receive nodes, thereby enabling meta data to be sent on the same physical radio medium that transports the audio data; and (f) the system is adapted to concurrently support closed-loop receive nodes and open-loop receive nodes in any combination.

In preferred embodiments, the system is adapted such that retransmitted data will be compressed to a different extent different than when originally transmitted.

In alternative embodiments, each receive node is adapted to output, as an audio signal, only such audio packets as are tagged by the transmit node as being specifically destined for that receive node, and to make retransmission requests to the transmit node, in cases where corrupted packets are received, only with respect to packets tagged by the transmit node as being specifically destined for that receive node.

In a further alternative embodiment, the transmit node incorporates multiple radio frequency transceivers and each receive node incorporates a single radio frequency transceiver.

In the preferred embodiment, the transmit node and the receive nodes are each implemented in the form of a wireless audio module, with each module comprising a processor PCBA containing the corresponding node's processor and audio signal circuitry, and a radio PCBA containing the corresponding node's radio frequency circuitry. Preferably, the processor PCBA and the radio PCBA of each module may be tested independently of one another, the processor PCBA and the radio PCBA of each module are electrically interconnected via a first electrical interface, and each module interfaces with a motherboard via a second electrical interface located on the associated processor PCBA.

An alternative embodiment of the invention incorporates two or more transmit nodes and two or more receive nodes, with the system being adapted such that each receive node, upon being powered up, will bond with a selected transmit node, and each receive node comprises bond rejection means which may be activated to reject the bond with the selected transmit node and to cause the receive node to bond to the next available transmit node, thus enabling a user to select a desired audio source.

In preferred embodiments, the system of the invention is adapted to implement an adaptive frequency-hopping technique. In such embodiments, the system stores a primary palette of multiple primary frequencies and a secondary palette of multiple secondary frequencies. Primary frequencies are identified by the system as superior-throughput performing frequencies and are used by the system for sending first copies of packets and copies of packets resulting from retransmission requests. Secondary frequencies are identified by the system as second-tier throughput performing frequencies and are used by the system for concurrent scouting of frequencies and transmission of redundant packets. The frequencies in the secondary palette of are changed on a regular basis to facilitate the system collecting throughput statistics on a maximum number of frequencies in the band. The system collects and records packet throughput statistics on all primary and secondary frequencies. When a particular secondary frequency is found over a selected sample period to have a higher average throughput than the primary frequency having the lowest average throughput over the sample period, that secondary frequency is added to the primary palette, and the primary frequency having the lowest average throughput is dropped from the primary palette and moved to the secondary palette. The system hops on a combined palette comprising both the primary palette and secondary palette, and each packet is transmitted two or more times, without a retransmission request. The system may be further adapted to configure audio data into a compressed base layer and one or more enhancement layers, with base layer packets being sent on primary frequencies and enhancement layer packets being sent on secondary frequencies.

In preferred embodiments, the processor of each node is adapted to implement a clock synchronization function for increasing or decreasing the node's audio clock frequency so that it will be synchronized with the audio clock frequency of a selected other system node. The means for increasing or decreasing audio clock frequency may comprise a voltage-controlled oscillator or varactor.

In an alternative embodiment, the processor in the transmit node engages two or more baseband units, enabling said processor to drive one or more radio frequency transceivers, the baseband units and the transmit node processor are implemented on a common semiconductor die.

The DWA system of the invention may have two or more receive nodes adapted to receive identical audio signals or different audio signals from the transmit node. Alternatively, the receive nodes may be adapted to receive a combination of identical and different audio signals from the receive node.

In preferred embodiments of the system of the invention, a hardware-multithreaded processor engages one or more baseband units and an equal number of radio frequency transceivers, on a common semiconductor die.

Also in preferred embodiments, two or more processors run software which implements a duplex control channel between the transmit node and one or more of the receive nodes, thereby enabling meta data to be sent on the same physical radio medium that transports the audio signal, and the duplex control channel is used to transport control information which has been received by an optical receiver at the receive node and which is rebroadcast by an optical transmitter at the transmit node.

BRIEF DESCRIPTION OF THE DRAWINGS

Embodiments of the invention will now be described with reference to the accompanying figures, in which numerical references denote like parts, and in which:

FIG. 12b is a schematic diagram illustrating an exemplary configuration of a data packet for transmission over a control channel as in FIG. 12a.

DETAILED DESCRIPTION OF THE PREFERRED EMBODIMENTS

Figure 1:
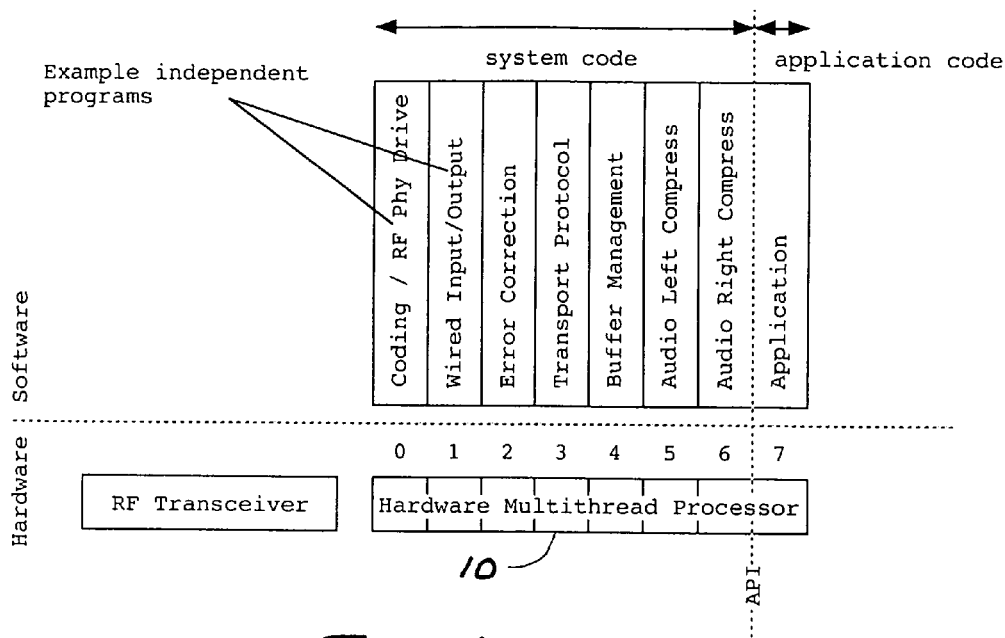
FIG. 1 is a schematic diagram of a hardware-multithreaded processor of a type suitable for use in association with each transmit or receive node of the present invention, incorporating system code for compression of audio signals.

FIG. 1 schematically illustrates a hardware-multithreaded processor 10 of a general type suitable for use in association with preferred embodiments of the present invention. Further information regarding suitable hardware-multithreaded processors is disclosed in the commonly-owned U.S. patent application Ser. No. 09/843,178, which application is hereby incorporated herein by reference in its entirety. In the exemplary processor 10 shown in FIG. 1, eight separate software programs can be run on a single hardware-multithreaded processor, simultaneously enabling multiple functional blocks in software. Since the multithreading is hardware-based, the software programs do not interfere with one another through hardware loading; i.e., they run independently, and a change in the audio compression algorithm will not affect the sensitive timing of the protocol, for example.

Figure 2:
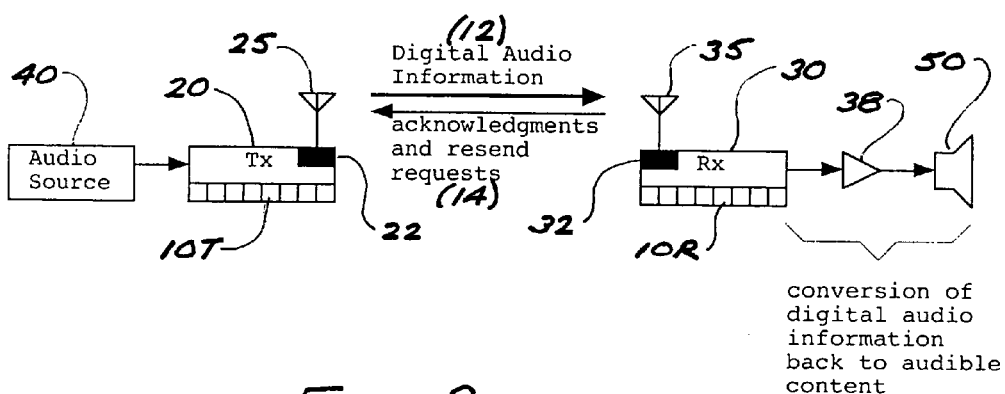
FIG. 2 is a schematic diagram of a DWA system in accordance with a first embodiment of the invention, having one transmit and one receive node.

FIG. 2 illustrates an embodiment of the present invention in which a transmit node 20 is engaged with a receive node 30 in order to transfer digital wireless audio information 12 from a digital audio source 40, for conversion to an analog signal (or signals) by means of signal converter 38 for reproduction as audible sound by speaker 50. Transmit node 20 has both transmitting means and receiving means, with antenna 25. In the embodiment of FIG. 2, the transmitting and receiving means are jointly provided in the form of a transceiver 22. Similarly, receive node 30 has both transmitting means and receiving means, with antenna 35, with the transmitting and receiving means being jointly provided in the form of a transceiver 32 as shown in FIG. 2. The audio source 40 may be either a digital audio source, or an analog audio source with an analog-to-digital converter. FIG. 2 also shows how transmit node 20 employs a hardware-multithreaded processor 10T and receive node 30 employs a hardware-multithreaded processor 10R which implements the baseband, protocol, error correction, I/O and audio compress/decompress functions in software.

FIG. 1 discloses an API interface that is provided between the "system code" and the "application code". As an example, FIG. 1 shows seven of eight threads dedicated to running system code and one thread dedicated to running application code. The benefit of this arrangement is in the ability to deploy the solution quickly in a number of different applications by different firms. Each application, be it a wireless speaker, headphone or other application, will have product-specific needs that will need to be taken care of by the application code (for example, reading a keyboard for user input or displaying information on an LCD screen, or handling the charging of a headphone's battery). This custom code can also make system calls of the system code as required (for example, to move information between nodes using the control channel). Having one or several threads of the hardware-multithreaded processor dedicated to running application code enables manufacturers to customize the application for their products' individual and specific needs. Moreover, the custom code will not affect the performance of the timing-critical system code running on the other "system" threads. APIs have been used for years in computer operating systems, but it is the hardware-multithreaded processor hardware that enables an API approach to digital wireless audio, which is a timing-critical application. Although FIG. 1 shows seven threads being system threads and one thread being an application thread, many other combinations are also viable in practice.

FIG. 2 also shows how the information flow is actually bi-directional, since both transmit node 20 and receive node 30 have bi-directional radios (i.e., transceivers in the illustrated case). This enables receive node 30 to send acknowledgments and requests for packets to be resent back to transmit node 20.

Figure 3:
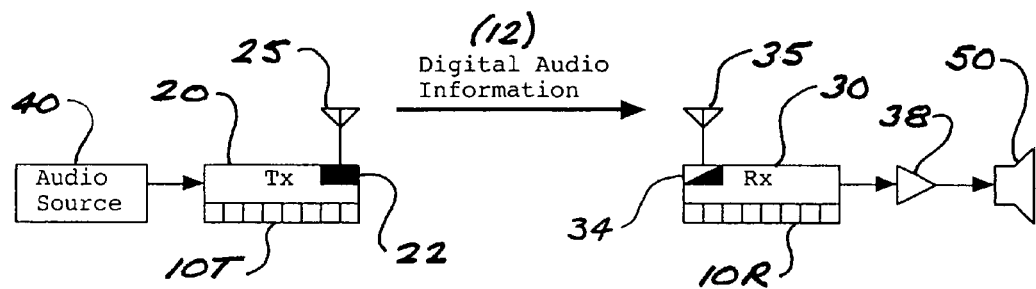
FIG. 3 is a schematic diagram of a DWA system in accordance with a second embodiment, having one transmit node with an RF transceiver and one receive node with an RF receiver.

FIG. 3 shows a configuration in which receive node 30 has an RF receiver 34 (i.e., a one-way receiver only, rather than a bi-directional transceiver). In this case, audio information 12 may still be transferred, but in the case where an audio data packet is received corrupted (and local repairs to the packet at receive node 30 are impossible), there is no way for receive node 30 to request a resend (i.e., retransmission) of that packet. Therefore, the QoS of the system in FIG. 3 will be lower than that of the system in FIG. 2; however, the system's cost and power consumption will be also lower.

Figure 4:
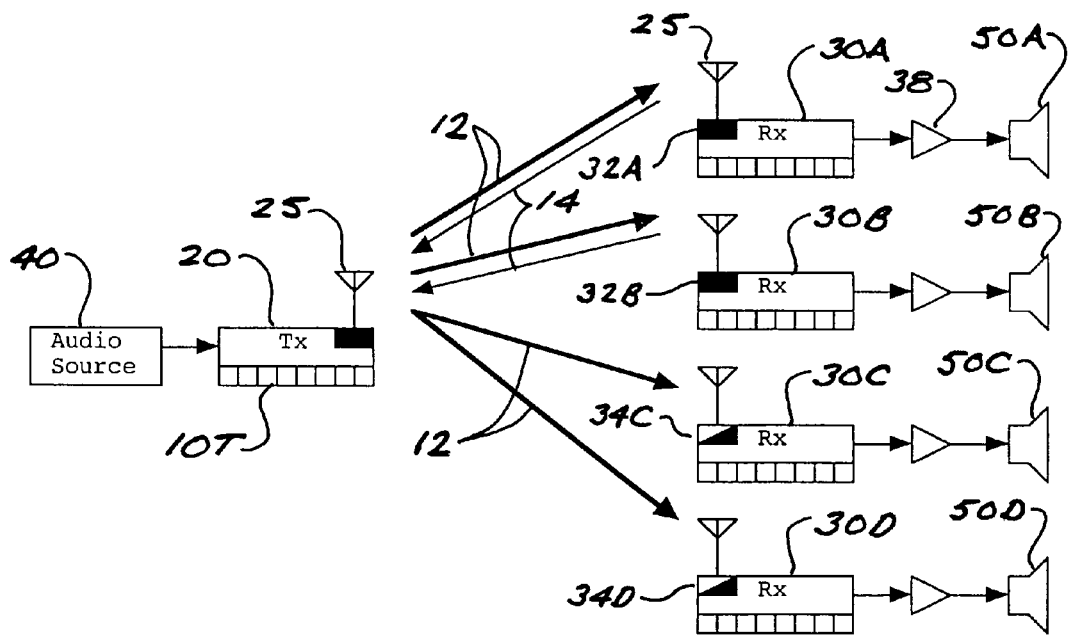
FIG. 4 is a schematic diagram of a DWA system in accordance with a third embodiment, having a single transmit node with an RF transceiver, and multiple receive nodes each having an RF receiver.

FIG. 4 discloses a multipoint system comprising a single transmit node 20 and multiple receive nodes 30A, 30B, 30C, and 30D, with corresponding speakers 50A, 50B, 50C, and 50D. In the figure receive nodes 30A and 30B are fitted with RF transceivers 32A and 32B, and are operating in a closed-loop mode called "active mode" (as in the system in FIG. 2). Receive nodes 30C and 30D are fitted with RF receivers 34C and 34D and are operating in an open-loop mode called "passive mode". Alternatively, receive nodes 30C and 30D may be fitted with full RF transceivers that operate solely in receive mode due to some system constraint.

It will be apparent, in view of the previous discussion, that receive nodes 30C and 30D will have a lower QoS than receive nodes 30A and 30B. However, what may not be as readily apparent is that receive nodes 30C and 30D will have a QoS that is better than the system in FIG. 3. This is because receive nodes 30C and 30D are able to take advantage of resent packets that are requested by receive nodes 30A and 30B. In cases where interference causes packet corruption, and where receive nodes 30C and 30D are set to receive and output the same audio information as receive nodes 30A and 30B, the resent packet requested by receive nodes 30A and 30B will also be useful to receive nodes 30C and 30D and will be used as available.

This scenario illustrates an important aspect of the invention. All audio information transmitted by the transmit node 20 is available to all receive nodes 30. Depending on their individual settings, each receive node 30 may output or ignore certain portions of the transmitted audio information 12.

Figure 5:
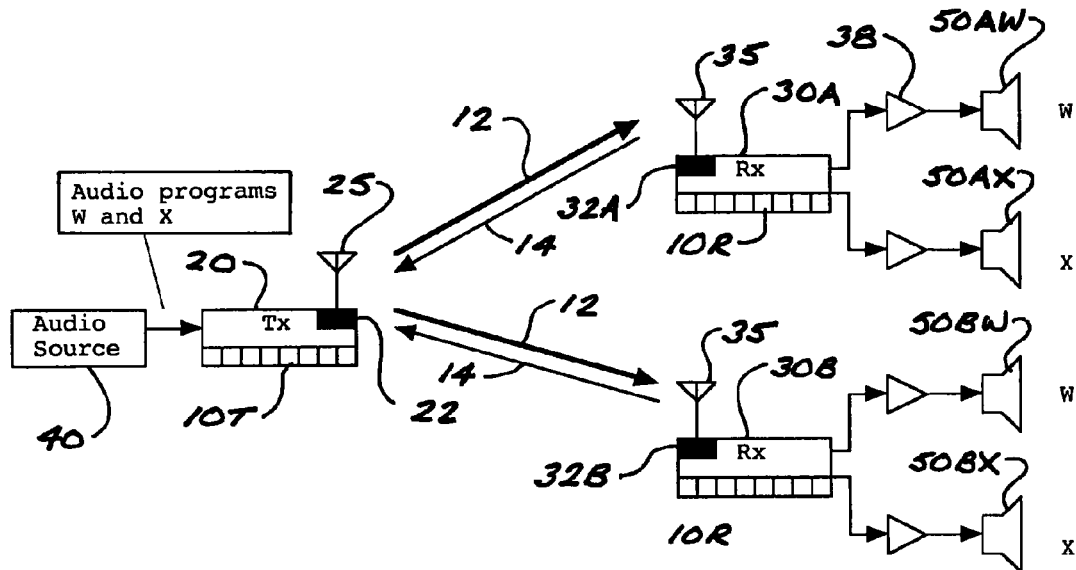
FIG. 5 is a schematic diagram of a DWA system in accordance with a fourth embodiment, in which a single transmit node sends two audio signals to each of multiple receive nodes.

FIG. 5 illustrates an embodiment in which transmit node 20 is sending two audio programs (W and X) to multiple receive nodes (indicated as receive nodes 30A and 30B for exemplary purposes). Each receive node is set to receive both program W and program X. Receive node 30A has speakers 50AW and 50AX, for reproducing programs W and X respectively, and receive node 30B similarly has speakers 50BW and 50BX. In this scenario, it is readily apparent that transceivers 22, 32A, and 32B are similarly loaded; i.e., transmit node 20 must transmit a payload data rate (measured in bits per second, or bps) sufficient to carry both program W and program X, and receive nodes 30A and 30B must each receive that identical payload.

Figure 6:
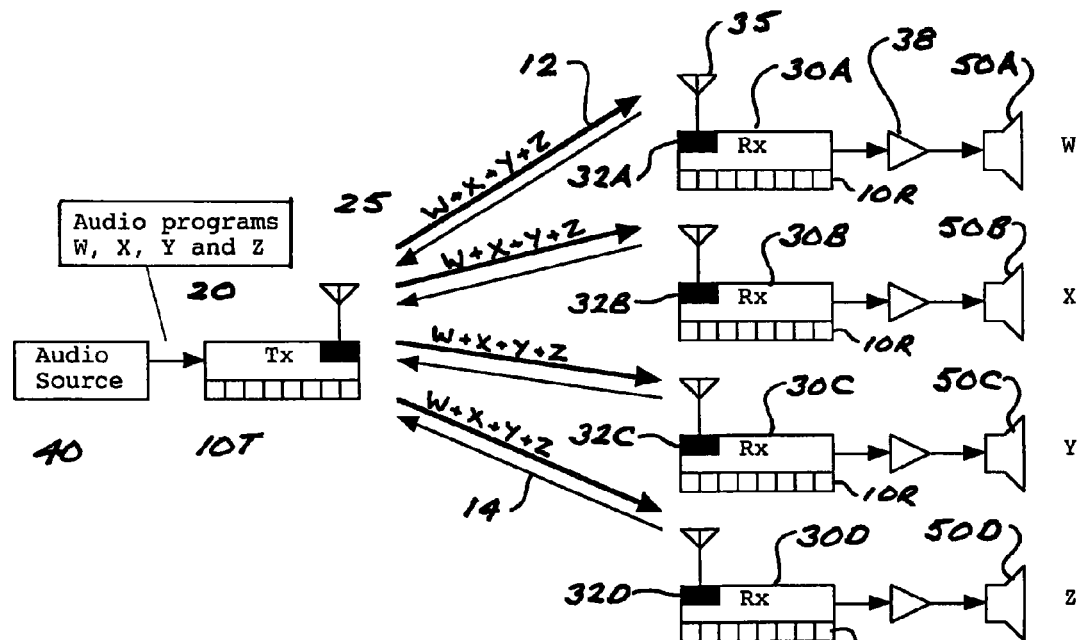
FIG. 6 is a schematic diagram of a DWA system in accordance with a fifth embodiment, in which a single transmit node sends a different audio signal to each of four receive nodes.

In contrast, FIG. 6 illustrates an embodiment similar to FIG. 4, but in which receive nodes 30C and 30D have RF transceivers 32C and 32D (respectively) rather than RF receivers. In the embodiment of FIG. 6, transmit node 20 transmits audio programs W, X, Y, and Z, while each receive node delivers only one program to its corresponding speaker. Accordingly, the payload that transmit node 20 must send is four times the payload that each receive node must receive. For example, if the payload per audio program is 250 kbps, all nodes must be equipped with radio transceivers capable of transporting a payload of 4×250 kbps=1000 kbps (because the receive nodes must be able to transfer data at the same rate as the transmit node). However, the transceivers in the receive nodes will be idle 75% of the time. In other words, the transceivers in the receive nodes only deliver 25% of the value that has been paid for. Therefore, in the system shown in FIG. 6, a total capacity of (5×1000) kbps=5000 kbps is provided (and paid for), but only (1×1000 kbps)+(4×256 kbps)≅2000 kbps are used on average. This results in significant waste in terms of payload capacity and cost.

Figure 7:
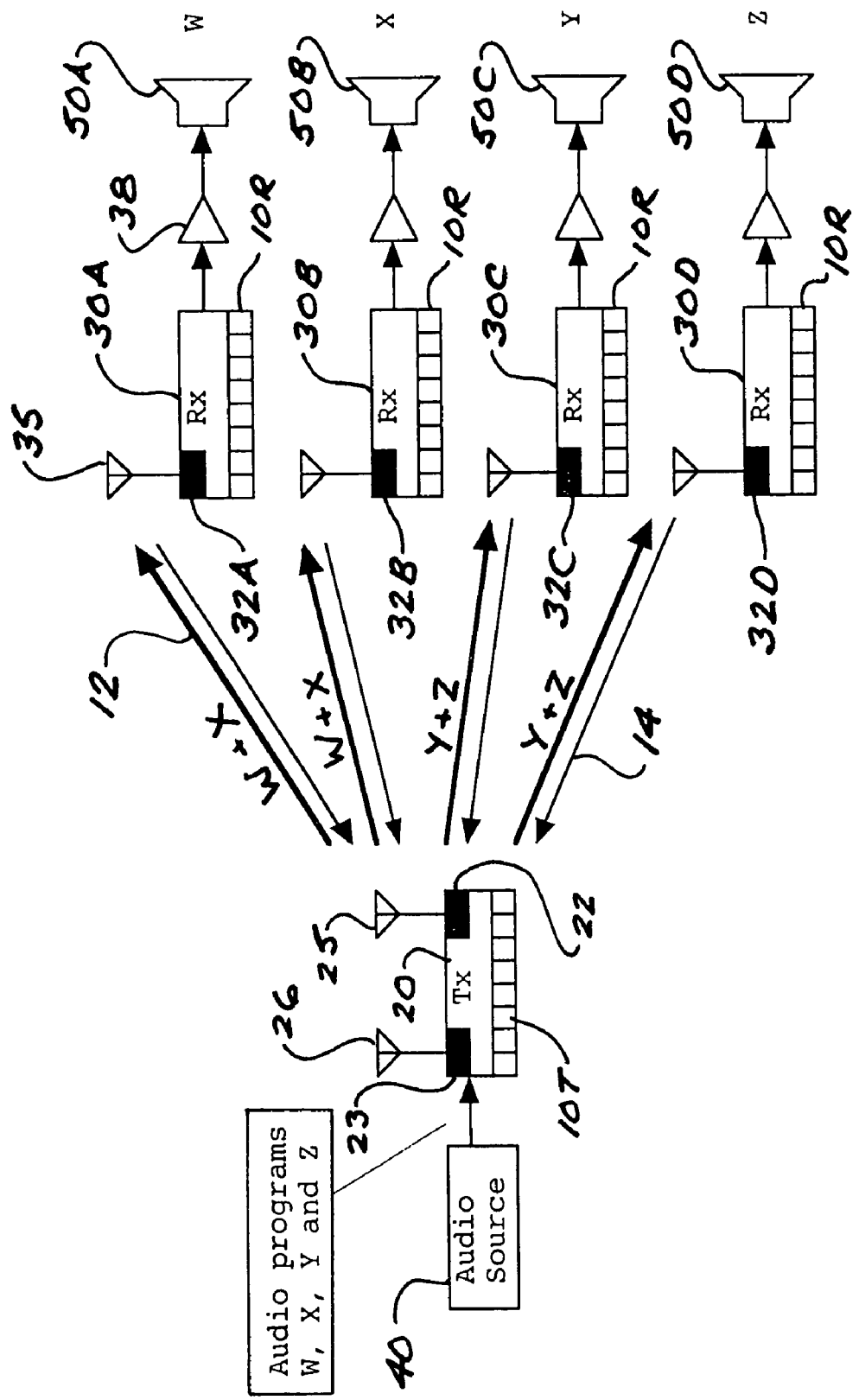
FIG. 7 is a schematic diagram of a DWA system similar to the system of FIG. 6 but with the transmit node having two transceivers.

This is an important kind of waste, the reduction of which may be addressed in accordance with the present invention. FIG. 7 shows how the waste can be reduced by adding a second RF transceiver 23 to transmit node 20. Carrying on with the example numbers from the discussion of FIG. 6, each of the transceivers 22 and 23 in transmit node 20 transmits only two audio programs (either W+X, or Y+Z) and therefore must be capable of (2×250 kbps)=500 kbps, which still amounts to a total transmission capacity of 1000 kbps, since there are two transceivers. However, each transceiver 32A, 32B, 32C, and 32D in receive nodes 30A, 30B, 30C, and 30D now only needs to be capable of 500 kbps, and will be idle only 50% of the time instead of 75% of the time (as in FIG. 6). In this case, therefore, a total capacity of (2×500 kbps)+(4× 500 kbps)=3000 kbps are paid for, while 2000 kbps is used on average (as before). Waste has thus been reduced from 3000 kbps to 1000 kbps (average).

Although FIG. 7 shows transmit node 20 as having two transceivers (22 and 23), each with its own antenna (25 or 26), in alternative embodiments the transceivers may share a common antenna. It will also be readily appreciated that additional waste may be eliminated by adding a third transceiver, and so forth. Efficiencies are gained by having the transceivers at transmit node 20 served by a single hardware-multithreaded processor 10T; however, the system may also work with multiple processors (e.g., one per transceiver).

Figure 8:
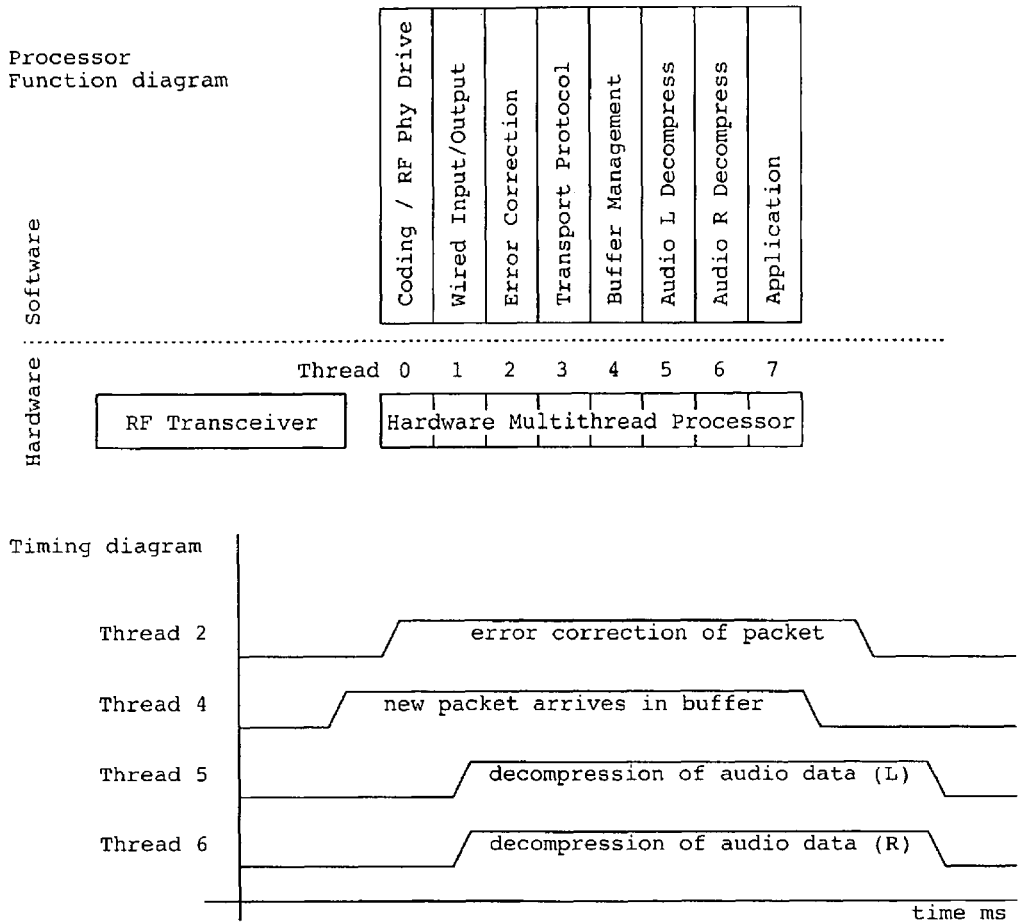
FIG. 8 is a schematic processor function diagram illustrating of the progress of audio data packets through a hardware-multithreaded processor having system code for decompression of audio signals.

FIG. 8 schematically illustrates one way in which the implementation of functions on the hardware-multithreaded processor reduces total system latency. The arrival of a new packet in the buffer is shown as the initial event; in this example, the buffer is handled by thread 4. Processing of the new packet can be commenced by the other threads before the packet is fully received. FIG. 8 shows error correction and audio decompression starting prior to the whole packet being received; however, this concept can be extended to many other functions. Using this technique, a high level of parallelism can be achieved and end-to-end latency minimized. FIG. 8 specifically illustrates a receive node, but this technique can also be used on the transmit node with similar benefits.

Figure 9:
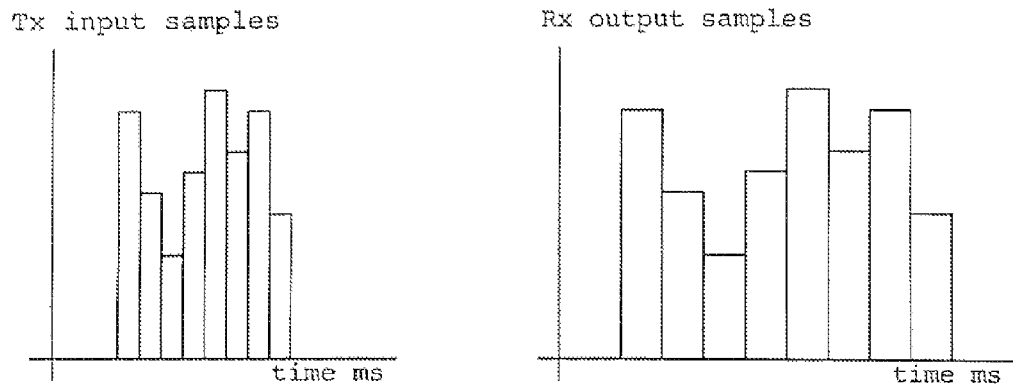
FIG. 9 is a schematic illustration of discrepancies between sampling rates between transmit and receive nodes in a DWA system.

FIG. 9 schematically illustrates an inherent problem in digital wireless audio. The audio sample rates are derived from two independent crystal clocks, one on the transmit node side and one on the receive node side. The problem is that because crystals have a tolerance, they do not produce exactly the same frequency; hence, the audio sampling frequency will not be exactly the same. For example, where a sampling rate of 48,000 samples per second is intended, the transmit node might actually be sampling at, say, 48,000.05 samples per second, while the receive node might be outputting audio at 47,999.93 samples per second. The result in this example is that the receive node will begin to get a glut (i.e., overflow) of incoming samples, since it is not outputting audio as fast as the samples are coming in.

The difference in input and output blocks is shown greatly exaggerated in FIG. 9 (in which the amount of time required to input a given number of audio samples at the transmit node is graphically shown as being less than the amount of time for the same number of samples to be output at the receive node). As is apparent, when it takes longer to output a block of samples than it takes to input them, the system will have a problem. The opposite problem is also possible. If the transmit node clock is slower than the receive node clock, the receive node will be outputting data faster than it is coming in, and it will run out of samples. These problems are virtually certain to happen in actual implementation, since crystals always have variance.

Figure 10:
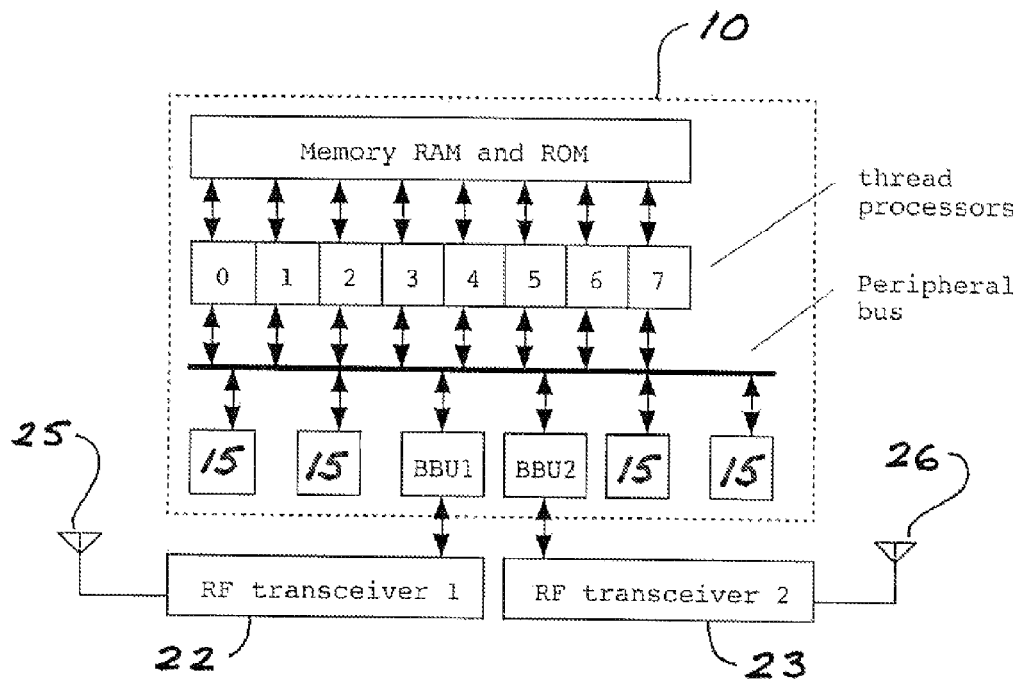
FIG. 10 is a schematic diagram of a hardware-multithreaded processor configured to drive multiple RF transceivers.

Previously discussed were the benefits of driving more than one radio with a single hardware-multithreaded processor 10, as shown in FIG. 7. FIG. 10 shows how this can be accomplished in the processor 10 itself, in association with a transmit node having two RF transceivers 22 and 23. The processor 10 is shown as having eight logical thread processors, each with access to common memory and a common internal peripheral bus. Engaged with the peripheral bus are numerous I/O blocks including two baseband units (BBUs), marked in FIG. 10 as BBU1 and BBU2. These hardware I/O peripherals perform the interface function with digital radios including bit and word synchronization, FEC coding, and other required functions. In this configuration, a single processor thread can drive both BBUs (and hence both transceivers), or separate threads can drive each BBU. Here, BBUs are shown "on chip" and the radio transceivers 22 and 23 are shown "off chip"; however, other configurations are also viable such as having one or both BBUs off chip. Alternatively, single-chip solutions (i.e., with the processor, one or both BBUs, and one or both radios all on the same silicon die) are also possible. The I/O blocks indicated by reference number 15 in FIG. 10 could be any of several types of prior art processor components that are not relevant to the present invention (for example, digital audio serial interface, vector processing unit, and serial peripheral interface bus host/slave controllers).

Figure 11:
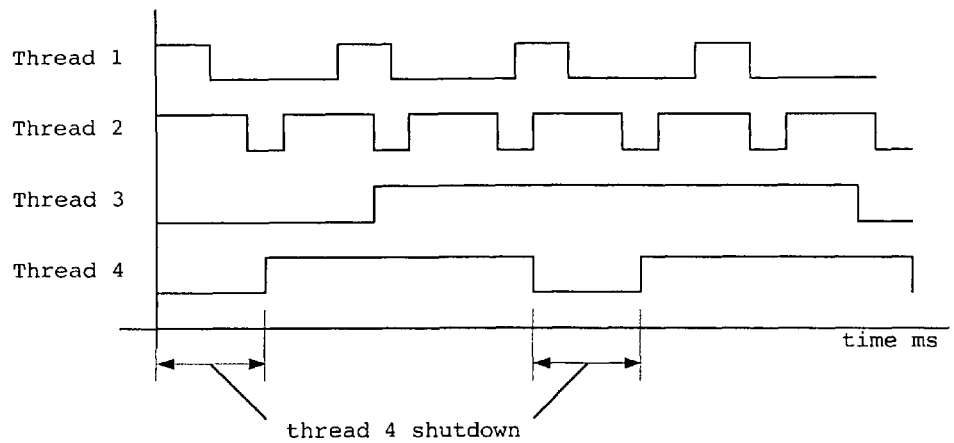
FIG. 11 is a schematic diagram illustrating an exemplary duty cycle regime of a hardware-multithreaded processor in which certain threads can be shut down when not in use.

Power consumption reduction is a very desirable result in battery-operated DWA devices such as wireless headphones. FIG. 11 illustrates how some threads of hardware-multi-threaded processor may have a duty-cycle-type operation in which one or more threads do not need to be running all the time. The processor shuts down one or more threads for periods when they are not in use (as shown for thread 4 in FIG. 11, by way of example). Power is conserved because a thread that is shut down does not use power accessing memory and other blocks within the processor. Further, the processor also shuts down other peripheral devices when they are not needed, or for part of a duty cycle whenever possible. This includes peripheral blocks such as the BBUs (see FIG. 10), and external peripheral devices such as the RF transceivers, RF power amplifiers, and RF low-noise amplifiers if present.

Figure 12A:
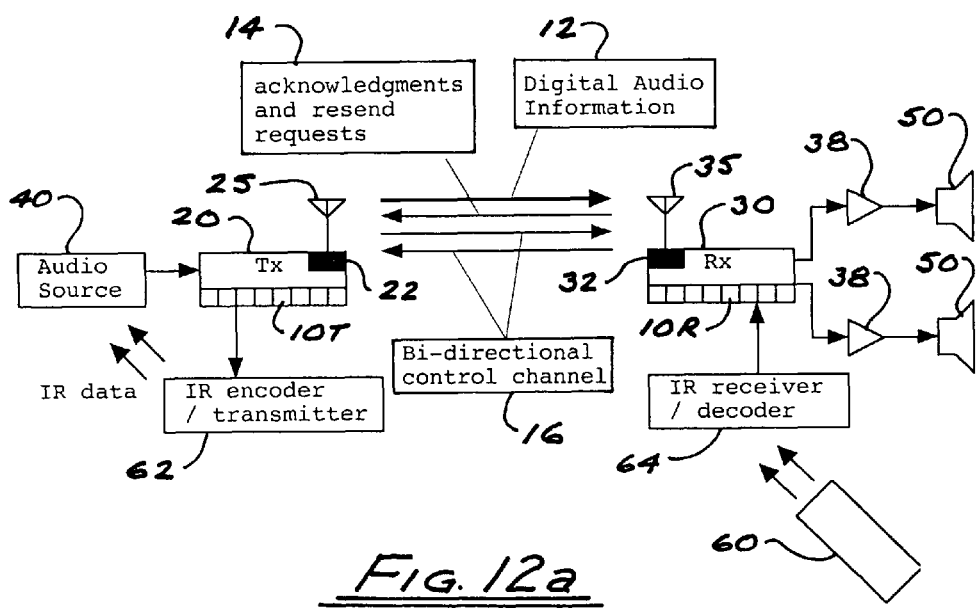
FIG. 12a is a schematic diagram of a DWA system in accordance with an alternative embodiment of the invention, implementing a bidirectional control channel.
Figure 12B:
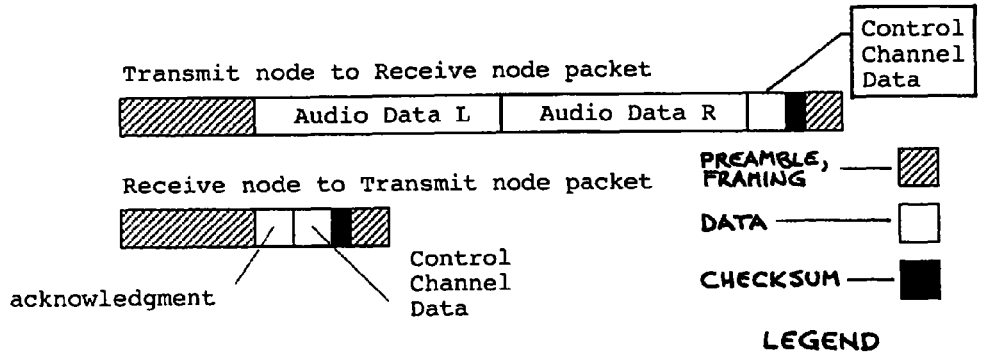

FIG. 12a schematically illustrates how a control channel may be implemented in a preferred embodiment of the present invention. In addition to the audio information 12 and acknowledgments (and resend requests) 14, the RF PHY now carries a bi-directional control channel 16 as well. FIG. 12b schematically illustrates how the data packet structure may be modified to allow embedding the control channel data within the data packet. FIG. 12a shows the control channel 16 being used to transfer infrared (IR) data over the RF PHY to allow a standard IR remote control 60 to be used (in conjunction with an IR encoder/transmitter 62 and an IR receiver/decoder 64) to control the audio source 40 from a different room. This is just one example of the use of the control channel; i.e., with control data being sent only one way (from receive node 20 to transmit node 30).

Other examples would use control channel 16 in the other direction or both directions. For instance, in multipoint configurations such as in FIG. 5 and FIG. 6, volume control buttons on the receive nodes can be used to set volume parameters at the transmit node which the transmit node then distributes to all receive nodes via control channel 16, thereby changing volume at any speaker changes the volume for the whole system. Another possible application could involve sending song title information from the transmit node to the receive node and displaying it on an LCD screen at the speaker. Other uses for control channel 16 are possible, and more than one of these applications can be implemented concurrently in the same product.

Figure 13:
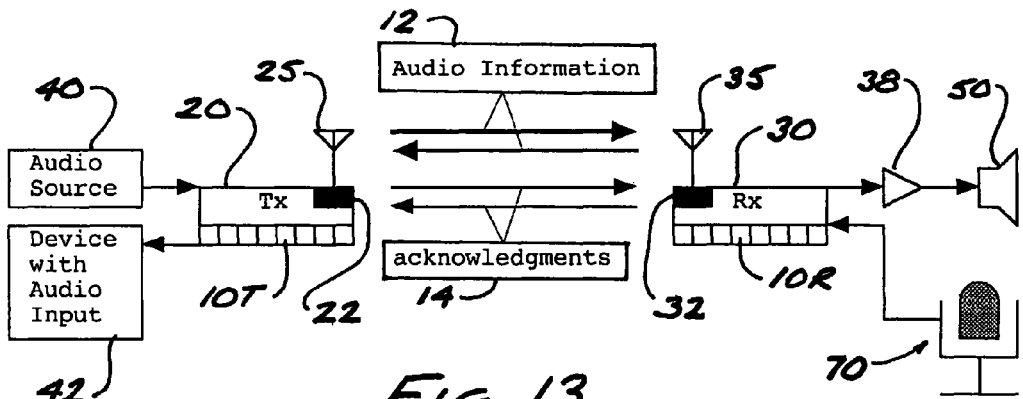
FIG. 13 is a schematic diagram of a DWA system adapted to implement two-way audio.

FIG. 13 schematically illustrates an alternative embodiment of the invention in which a bi-directional RF PHY is used to implement two-way audio. This requires the use of RF transceivers at both nodes (i.e., transceiver 22 at transmit node 20, and transceiver 32 at receive node 30), with an audio input device 42 being associated with transmit node 20. This implementation is useful in applications such as headsets (e.g., where there is a microphone 70 at receive node 30 in addition to an associated speaker 50). Although FIG. 13 shows a simple point-to-point system, it is also viable to implement multiple receive nodes, each with microphone or other audio input, in a point-to-multipoint configuration.

Figure 14:
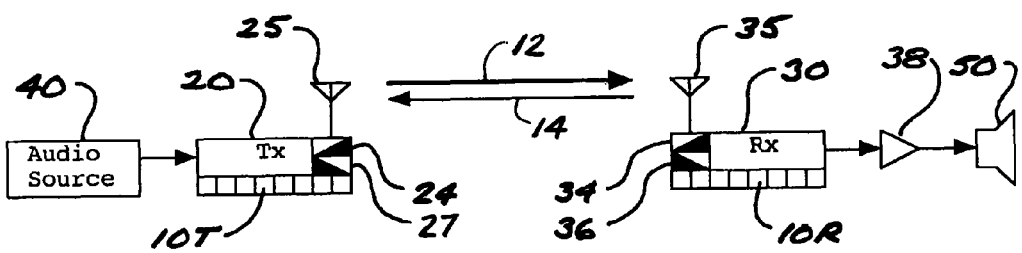
FIG. 14 is a schematic diagram of a DWA system having separate RF transmitters and receivers at each transmit and receive nodes.

FIG. 14 illustrates how separate receivers and transmitters may be employed in the transmit and receive nodes, rather than transceivers. Transmit node 20 has RF transmitter 24 and RF receiver 27, and receive node 30 has RF transmitter 34 and RF receiver 36. This arrangement offers better performance (particularly with respect to reducing latency), since it enables full duplex RF communication to be achieved (i.e., each node can be transmitting and receiving concurrently). This is typically not possible in the transceiver case, because most transceivers share internal functional blocks between transmit and receive functions, thereby limiting most transceivers to half-duplex operation. Full duplex operation, on the other hand, enables acknowledgments 14 to be sent from receive node 30 to transmit node 20 at the same time as audio information 12 is sent from transmit node 20 to receive node 30; this means that a more efficient pipeline of audio information is created. Furthermore, full duplex operation eliminates direction-switching time (which is time wasted in the half-duplex scenario, and which increases latency). Although FIG. 14 illustrates a simple point-to-point system, the same basic concept may be readily adapted for use in a point-to-multipoint configuration.

Figure 15:
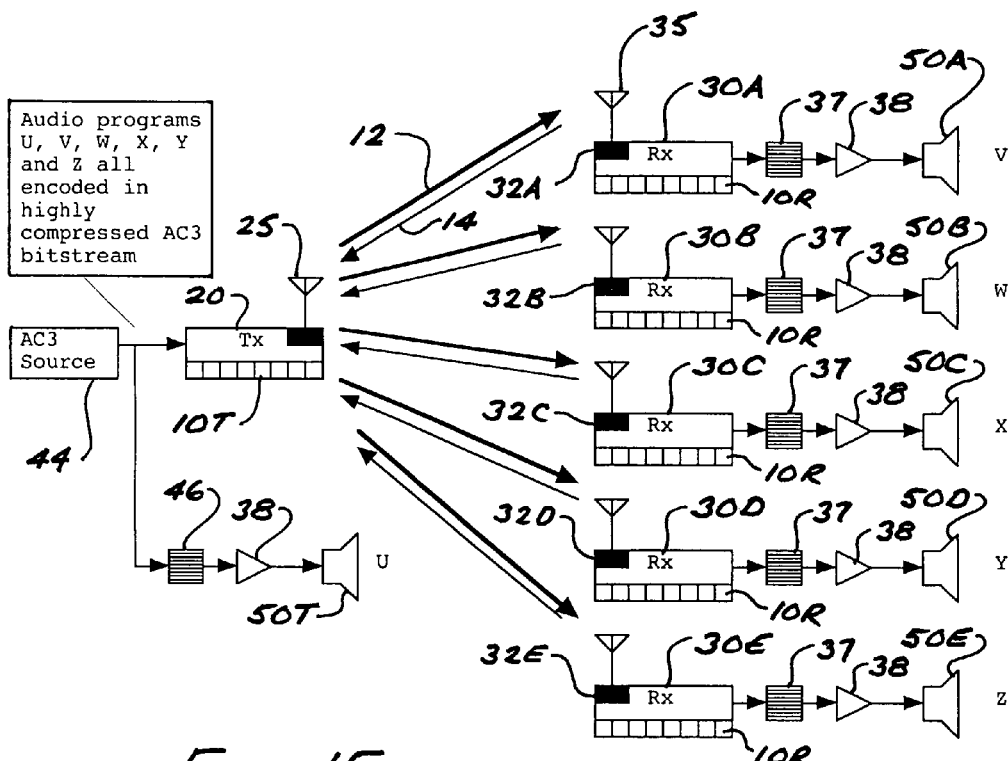
FIG. 15 is a schematic diagram of a DWA system adapted to decode a highly-compressed digital bitstream and send separate audio programs to each of multiple speakers.

FIG. 15 illustrates how a highly compressed digital bitstream (the example shown is Dolby Digital 5.1 channel, otherwise known as AC3 format) may be used as a source in a home theater speaker solution. In the illustrated embodiment, transmit node 20 is associated with an AC3 audio source 44 which provides compressed audio programs U, V, W, X, Y, and Z. The transmit node 20 in this case is shown as the subwoofer associated with a decoder (decompression means) 46 that decodes a single channel of audio (program U in the illustrated example) from the composite AC3 bitstream and outputs it to a local speaker 50T. The entire AC3 bitstream is also transmitted via wireless RF PHY to multiple receive nodes 30 with associated satellite speakers 50 (a total of five are shown in the illustrated example, which corresponds to Dolby 5.1). Each satellite speaker 50 also has an AC3 decoder 37 that decodes only one of the constituent five channels in the AC3 stream. Because of the extremely high compression associated with AC3 streams, there is an intrinsic benefit in this approach because the payload data is very low (for example, 384 kbps for all six audio programs). The disadvantage is that each node requires an AC3 decoder. The subwoofer channel can also be transmitted via the RF PHY as well, if that is desirable in the end product. Also, more speakers can be supported using this approach such as seven or eight speakers or more (Dolby 6.1 and Dolby 7.1). Other audio-encoding formats (such as DTS) can be used rather than AC3.

Packet resends are an important technique in creating high QoS. Sending replacement packets with a higher level of error protection is an important technique for making sure the replacement packets get through. In the case where a primary packet has arrived corrupted, there is a great deal of time pressure to ensure that the replacement packet arrives before that time slot (hole) in the buffer is output to the associated speaker. Therefore, in order to ensure that the duplicate (resent) packet gets through, a higher-strength FEC technique may be used on the resent packet. A higher-strength FEC technique means that a greater level of redundant information is embedded into the packet than usual (i.e., more redundant information than a primary packet, which in fact may have none) such that any bit corruption that may occur during transmission through the air is more likely to be something the receive side can repair without requiring yet another resend.

In DWA devices, there is typically a planned difference between the gross data rate of the RF PHY and the net data rate of the intended payload. This is because protocol overheads take up some of the RF PHY's available data rate, but even more importantly, excess "extra" data rate is required in case resends are required in order to maintain a high QoS. This planned difference is sometimes called the "data rate margin", and can be 2:1 or higher as a general guideline for a good system. Accordingly, for a system intended to carry a payload of (for example) 480 kbps, a 1.1 Mbps PHY would be a reasonable choice, resulting in some built-in (or planned) spare time for the PHY. During this spare time, it is desirable for the PHY to listen to other channels or send dummy (or redundant) packets on other channels.

Figure 16:
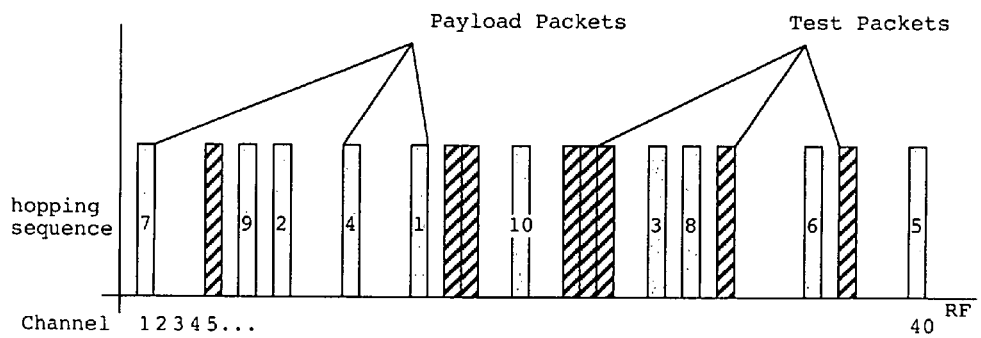
FIG. 16 schematically illustrates the process of active scouting in conjunction with FHSS methods.

FIG. 16 schematically illustrates how this technique can be employed in a hopping (FHSS) PHY solution. There are forty discrete RF channels identified in the band that may be used. The PHY takes care of all of its actual work in the first ten hops (following a random, quasi-random, or pre-defined hopping pattern), delivering all of the required audio data to the other side in these hops. Then (for example) it has eight additional hops that it can do in this cycle, sending experimental "test data" packets on eight new RF channels to scout them ("active scouting"). In accordance with this technique, performance statistics on those eight channels may be accumulated to see if they are "good" or "bad" channels.

A related technique may also be used to scout RF channels by just tuning to them and listening, without sending dummy packets; this technique may be referred to as "passive scouting". This technique has the benefits of consuming less power and not "polluting" the band with additional RF traffic; however, it does not provide channel performance statistics that are as definitive as the active scouting method. The reason for this is that interference is not the only thing that makes a channel "bad". A channel may be bad because of path loss characteristics, because of multipath nulls or because the RF PHY (on one or both ends) performs poorly on that RF frequency. The most definitive channel performance statistics come from actively testing the channel to determine whether the data "makes it through".

As already mentioned, a downside of active scouting is that it creates RF pollution; the dummy packets sent in active scouting tend to congest the band even further, making successful co-existence with other devices operating in the band more challenging. A further downside of active scouting is power consumption since actually transmitting data always requires more power than just listening. Active scouting may be done with a known "dummy" packet or simply with duplicate audio packets (copies of already-sent audio packets). Both techniques have advantages. Using duplicate audio packets reduces the need for retransmission requests in cases where the duplicate audio actually solves a problem for the receive node (if the original audio packet arrived corrupted). Using known dummy packets has the benefit that both transmit and receive nodes already "know" what is in the dummy packet; therefore, the bit errors in a received dummy packet can be analyzed instead of just tagging the whole packet as corrupt or not corrupt; i.e., finer-grained, more meaningful statistics may be collected if bit errors can be seen, rather than just packet errors.

Either method of scouting (passive or active) enables adaptive frequency hopping, and other methods of adaptive use of the RF band. Adaptive frequency hopping may also be achieved without scouting of any kind, simply by using the real payload packets to collect the RF channel performance statistics, and recovering from packet failures via retransmissions.

An advanced method of adaptive use of the RF band is enabled by the listening technique of passive scouting described above. In this method, signals listened to from other devices using the band are classified and the reaction by the system is dependent on the classification. For instance, one classification could be for a type of device that will not benefit from avoidance (such as a microwave oven), another classification could be for a type of device where avoidance attempts would be ineffective (such as a fast frequency-hopping device), and another classification would be for a type of device where both the system and the other device would benefit from the system's avoidance reaction (such as a DSSS device).

Figure 17:
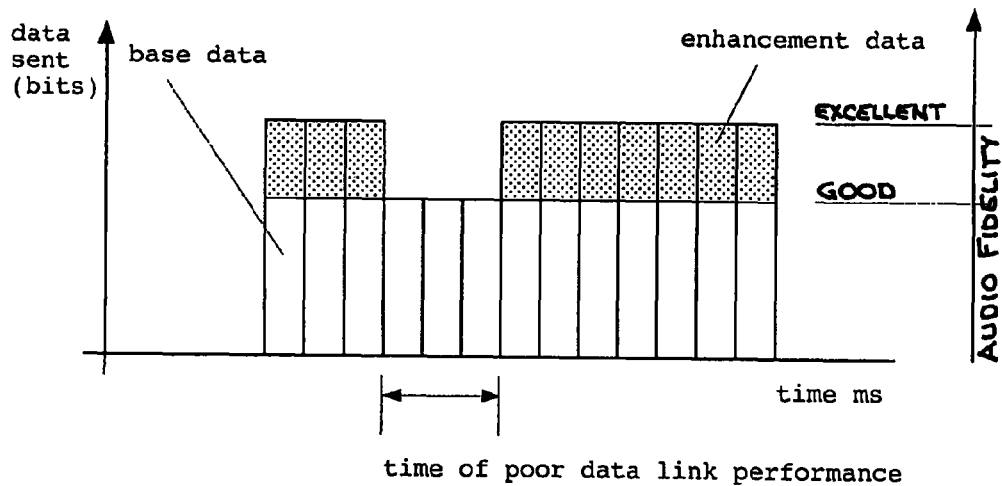
FIG. 17 schematically illustrates the use of enhancement data in audio signals to maintain audio fidelity quality in the event of poor data link performance.

FIG. 17 schematically illustrates how even a data link exhibiting variable performance can be made to deliver solid QoS with some variability in the resulting output fidelity. The audio information content is split into two or more data "layers" where the base layer is highly compressed and delivers a "good" level of audio fidelity on its own. As long as there is sufficient data link rate available, packets of enhancement layers are delivered to the receive node as well as the base layer packets which, in combination, provide an improved level of audio fidelity at the output. If the available data rate is not sufficient to deliver both the base and enhancement layers, the enhancement layers are sacrificed in favor of reliably delivering the base layers to the receive node. FIG. 17 discloses a single enhancement layer but certainly, more than one enhancement layer would be possible and may be desirable.

The real data rate available to the solution varies with time. In cases where the instantaneous data rate can dip far below the requirement, but where the average data rate over a particular period of time (X ms) is sufficient to maintain satisfactory QoS, using a buffer on the receive node of at least X ms will enable the system to operate reliably. Naturally, buffers introduce latency, and this is undesirable in some applications. Therefore, it is preferable to use a buffer of a size large enough to handle the variability in available data rate, but not larger than necessary. Buffer size may be made to be configurable by the product manufacturer or even the end user, and to be set according to the type of use and the harshness of the environment. It may also be desirable for the system to reconfigure its own buffer size. For example, in a home theater application (an application where low latency is desirable), the system may start up with very small buffers on its receive nodes, and if it encounters a problem (e.g., if its buffers empty and the system is forced to mute the output), it can mute, increase its buffer size, and then un-mute when its buffer is sufficiently full. This way, although the system may mute a few times to begin with, the buffer size will be set only as large as necessary.

In preferred embodiments, the system is adapted to adjust the buffer size on the basis of actual system performance in prevailing environmental conditions.

Executing a "soft mute" upon emptying of the buffer is an important feature. It is more desirable from the listener's point of view to hear a mute than any sort of corrupted data (crackling, popping etc.). A mute should be at least 0.5 seconds in duration to be least obtrusive to the listener. Also, the beginning and the end of the mute must be softened (i.e., audio signal amplitude ramped down and up) so as not to offend the ears of the listener. An algorithm may be implemented to insert calculated samples to bring the last (real) output sample safely down to zero. Ending mute may be done by scaling the data from zero up to the actual data over a few samples. This is effectively a rapid "turn down" of the volume and "turn up" of the volume, rather than an abrupt cut-out and cut-in (with associated transient pop sounds).

Figure 18:
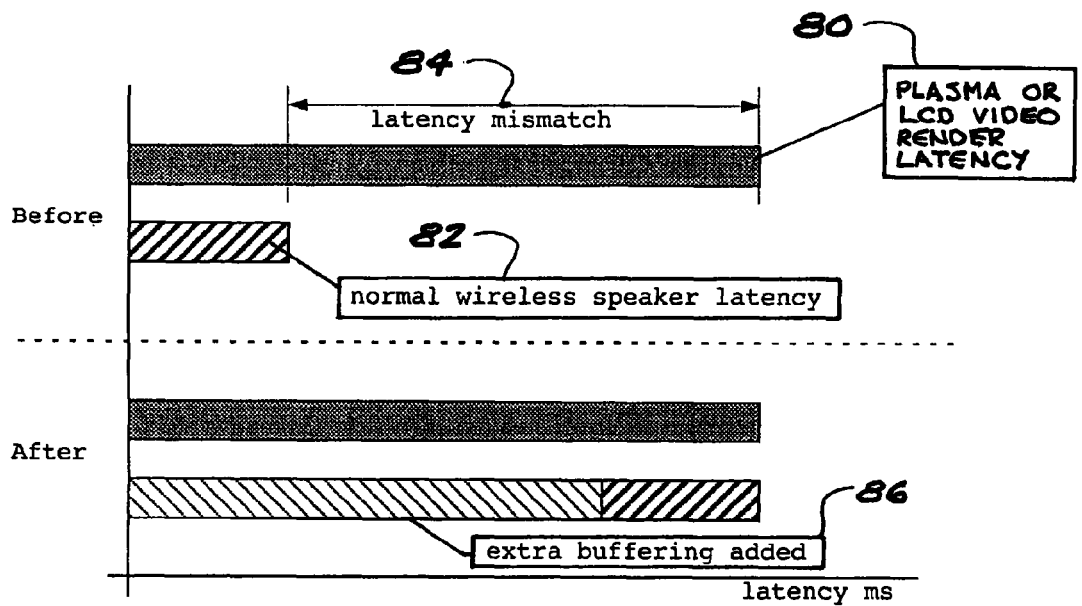
FIG. 18 schematically illustrates the use of additional buffering in a DWA speaker system to correct a latency mismatch between audio and video signal transmissions in a home theatre system.

FIG. 18 schematically illustrates how in some home theater applications the video-rendering latency 80 may be longer than the audio latency 82 introduced by the DWA speaker system. This is commonly the case with many video display technologies that require rendering such as plasma, LCD, and other types of displays. In the illustrated example, the video is delivered later than the audio by a time equal to the "latency mismatch" 84. This problem may be corrected (and the QoS of the wireless system improved) by the addition of extra buffering 86 in the DWA speaker system such that the net audio latency (i.e., 82 plus 84) substantially matches the net video latency 80.

Similarly, if the entire home theater solution also includes some wired speakers, delay lines can be introduced in front of the wired speakers that add a latency to them that matches the video latency as well, thus enabling all audio channels and the video to be once again "in sync".

DWA latency will likely be the longest in the total home theater solution. In this case, it is desirable to minimize the latency of the DWA speakers (by using only as much buffer as required, as discussed previously) and then to add delay lines to any wired speakers such that their latency matches that of the DWA speakers, thus enabling accurate recreation of the sound field. It is actually more important to have the audio channels synchronized than to have the audio in tight sync with the video; most people have a high tolerance for audio/video sync mismatch (in the order of 100 ms), but much lower tolerance for audio/audio sync mismatch (20 ms or less).

Figure 19:
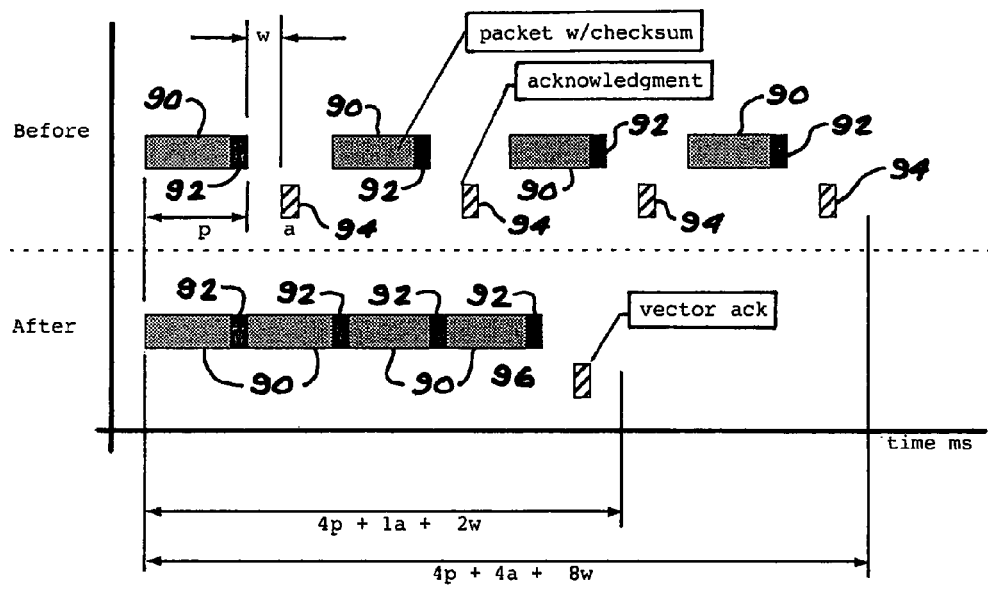
FIG. 19 schematically illustrates the use of vector acknowledgements to improve the efficiency of a DWA system.

FIG. 19 illustrates how vector acknowledgments ("vector ACKs") may be used to improve efficiency. The improved efficiency may be used to save cost (reducing the RF PHY data rate), to increase QoS, to increase fidelity of the system, or to reduce power consumption. The technique involves grouping audio information data packets 90 together into one long transmission. The packets 90 are still distinct as each packet 90 retains its own checksum 92. The vector ACK 96 that follows (i.e., sent from receive node to transmit node) contains four normal singular ACKs 94 in one (in the illustrated example). Because the acknowledgment is mostly overhead, the vector ACK 96 is almost the same size in bits as a normal singular ACK 94. The resultant saving in time is significant since a great deal of time is saved in not switching directions on the RF PHY (a process which always wastes a significant amount of time due to the radios having to relock PLLs and perform other startup functions). This wasted time is reduced from 8 w to 2 w in the illustrated example. If one of the data packets 90 arrives corrupted, the vector ACK 96 will inform the transmit node which packets in the group were bad. The bad packet(s) will simply be resent as one of packets in the next group.

Alternative ways of using acknowledgments will also yield efficiency improvements. For instance, the receive node can be configured to never send ACKs, and instead to send only non-acknowledgement messages ("NACKs") when a packet has arrived corrupted. This eliminates much wasted time, but also introduces some risk. Another method would be for the receive side to never send NACKs, but to have the transmit node understand that the absence of an ACK constitutes a NACK.

Figure 20:
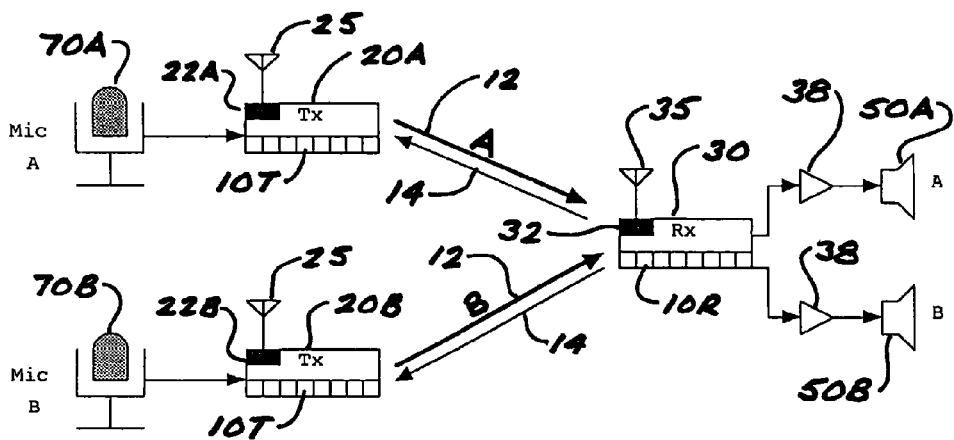
FIG. 20 is a schematic diagram of a DWA system in accordance with an alternative embodiment of the invention, with multiple transmit nodes engaged with a single receive node.

FIG. 20 illustrates an alternative embodiment particularly suited for the "karaoke" case. Multiple transmit nodes (20A and 20B in the illustrated example, with corresponding RF transceivers 22A and 22B) are engaged with a single receive node 30, with each transmit node transmitting a separate audio signal (signal A or B, in the example) from separate audio sources (e.g., microphones 70A and 70B) to receive node 30 for reproduction as audible signals at speakers 50A and 50B. Other techniques disclosed herein to achieve high QoS at low latency and low cost may be effectively employed in this case also. Especially desirable for the transmit nodes are power-saving techniques as previously disclosed, because the microphones are typically battery-powered.

It will be readily appreciated by those skilled in the art that various modifications of the present invention may be devised without departing from the essential concept of the invention, and all such modifications are intended to be included in the scope of the claims appended hereto.

GLOSSARY

This section sets out definitions and explanations of various terms, acronyms, and abbreviations as used in this patent specification.

Active Mode: Used to describe a closed-loop audio delivery system where the receive node sends requests for retransmission to the transmit node in cases where packets have arrived at the receive node corrupted (bad packets).

ACK: Acknowledged (short message sent from receive node to transmit node to inform it that the last packet was received ok)

AC3: The compressed, combined 6-channel digital audio stream used by Dolby Digital audio systems (5.1 channel audio systems, for example).

Adaptive Frequency Hopping: A process of upgrading the hopping palette based on the system collecting RF channel performance statistics. Such statistics may be collected simply by passing payload packets through RF channels, or by various scouting techniques. Channels that are performing well (i.e., better than one of the channels currently in the palette) are added to the palette while the poor performers are deleted; hence the system adapts to (avoids) the other traffic in the band (as long as it is static or slow-moving in the frequencies used). See also FHSS.

ADPCM: A low-latency compression algorithm that does not require floating point math and that is implemented in the time domain.

aLaw (or "A-Law"): A logarithmic sample-wise compression—achieves lossy compression of up to 2 to 1; similar to μLaw—a time-domain technique.

API: Application Programming Interface—this term has its roots in computer operating systems such as Mac OS and Microsoft Windows. Many useful "system" routines are made available to application programmers so they do not have to reinvent the wheel every time they write a new program for that operating system. In addition to writing application specific code, the programmer makes "system calls" which do things like open windows and provide pull down menus. The code for this is pre-existing and made available to the programmer to make application development faster, more consistent and more reliable.

Band: The band of RF frequencies used by a DWA system. For example, the 2.4 GHz ISM band extends from 2.400 GHz to 2.483 GHz and requires no license. Multiple RF channels may be defined and used within a band. Typically a system will use one band. Otherwise, it is called a multiband system.

The system synthesizes center frequencies for each channel it will use in the band. This process generates a discrete number of channels the system can select from. Some systems use just one channel; others hop across hundreds or thousands of channels. As an example, for a particular system the total number of synthesizable channels in the 2.4 GHz ISM band may be 85, whereas the hopping palette (i.e., subset of channels the system is hopping on) may be only 15 of those 85. Other systems change channels only if required (e.g., if there is interference on the current channel).

Baseband: In digital wireless systems, a broad term used to describe low-level processing of an outgoing signal before it is sent to the RF PHY. Also used to describe the low-level processing of incoming signals retrieved from the RF PHY. This term has acquired a different meaning in the realm of digital wireless systems than its typical usage/meaning in older wireless systems.

Baseband Unit: An I/O subsystem used to implement baseband processing of signals.

Bond: The process of system nodes finding and connecting with each other following power-up.

CD: Compact Disc

CD data rate: 16 bits×44.1 ksamples/s×2 channels=1.4112 Mbps (raw data, no compression—as it is on a store-bought compact disc).

Checksum: A number generated from the data in a packet. This can be done as easily as adding up each byte in the packet (possibly truncating the resulting most significant digits). This checksum can be calculated again at the receive node and compared with the one received with the packet. If the 2 checksums match, there's a high assurance that the packet has arrived error-free.

Coexistence: In cases where two or more systems are using a frequency band concurrently, the degree to which the systems can all enjoy good QoS; in other words, the degree to which they can avoid collisions with each other. To achieve "good" coexistence, ALL systems operating in the band must have "good" QoS, not just some of them.

DAB: Digital Audio Broadcast

Data link margin (ratio, %, or bps): The difference between the maximum raw bps that the physical layer is capable of and the required bps of the payload. In practice twice the PHY must support a bps of approximately twice the phy because of the overheads of packet framing and QoS techniques.

Data Rate: The rate in bits per second at which data is read, written, transmitted or received:
  bps: bits per second
  kbps: thousand bits per second
  Mbps: million bits per second DCT: Digital Cordless Telephone Dolby Digital: Encompasses Dolby 5.1, 6.1 and 7.1—uses the AC3 compressed data format.

Dolby 2.1: Home theater surround standard promoted by Dolby Laboratories—the number 2.1 represents two speakers (200 Hz-20 kHz) and one LFE (subwoofer <200 Hz).

Dolby 5.1: Home theater surround standard promoted by Dolby Laboratories; the number 5.1 represents five speakers (L, R, center, rear L, and rear R) and an LFE.

Dolby 6.1: Six speakers and an LFE (adds a rear center speaker to Dolby 5.1).

Dolby 7.1: Seven speakers and an LFE (adds L+R side speakers to Dolby 5.1).

DSSS: Direct Sequence Spread Spectrum—a type technique of sending a payload of X bits with a pattern of Y bits, typically where Y>>X. Because the number of legal bit patterns (legal Y's) are few, even a damaged pattern can often be recognized by the receiver and the corresponding X bits recovered. Can be considered a type of FEC.

DTS: A competing format to Dolby Digital (Dolby 5.1, 6.1, 7.1).

Duplex: Communication in 2 directions.

DWA: Digital Wireless Audio.

Environmental Conditions: In the RF context, a combination of factors that affect the performance of an RF transmission system. Environmental factors include the amount and type of RF interference present in the band used (e.g., from non-system devices), the amount of path loss between system nodes (including obstacles in the way, attenuation due to poor antenna orientation, moisture in the air, etc.), and multipath nulls that may be present due to RF reflections, and others.

Error correction: In the event that a data packet arrives at its destination corrupted, methods to repair or replace the data.

FEC: Forward Error Correction—various techniques of embedding redundant information in transmitted information such that some bit damage can be fixed at the receive side without a packet resend being required.

FHSS: Frequency Hopping Spread Spectrum—a method of statistically ensuring that at least some data gets through a system. The system hops on a set of RF channels rather than transmitting the payload on a single channel. The hopping is a way to "spread" the data transmission across many RF frequencies.

FM: Frequency Modulation—a common analog RF method for transmission of audio signals which is susceptible to several forms of audible noise due to interference and other RF channel problems.

FFT: Fast Fourier Transform—a technique for a computer to quickly compute a fourier transform of a group of data samples (a time domain to frequency domain transform).

HiFi (or Hi-Fi): High fidelity—generally taken as supporting audio ranging from 20 Hz to 20 kHz in frequency; sometimes also implying a stereo signal.

Frequency-domain Technique: Algorithms operating on an audio data stream by taking windows of data (groups of samples) and performing a fourier transform on them to get the frequency content of the window. After the frequency content has been manipulated, the resulting altered frequency domain information is transformed back to the time domain for output. Such techniques are used to implement audio filters and some types of compression algorithms.

Frequency Hopping: See FHSS.

Full Duplex: Communication in two directions concurrently.

Half Duplex: Communication in two directions but not at the same time (by time sharing of resources).

Hopping Palette: Of the total number of RF PHY channels defined by the system for use in the band, a subset of these on which the RF PHY hops in a sequence. The sequence can be random, pseudo-random, or predefined. The palette can also be adaptive (i.e., automatically upgraded by the system due to other RF traffic in the band). See Adaptive Frequency Hopping.

Image (or "stereo image"): A true representation of a stereo soundfield. Immersed in a complex soundfield, the combination of the differences in exact levels, differences in arrival times and differences in spectral coloration experienced by two ears can produce an accurate multi-dimensional picture of multiple instruments to the human brain. When instead captured by two microphones and then later reproduced by two speakers, a true "image" of the original soundfield can be recreated. If the sound reproduction system introduces issues such as a sync problem (e.g., L and R speakers are not exactly synchronized in the information they are outputting), the resulting distorted signals no longer present a true stereo image to the human brain. The concept of an image can be extended to more complex audio systems with more than two channels.

I/O: Input/Output

IR: Infrared—data or controls sent over infrared (invisible to the eye) light.

ISM (or ISM Band): Industrial Scientific Medical—a number of bands set aside by the government regulatory agencies for unlicensed use by commercial and consumer products. Examples are the 2.4 GHz ISM band (from 2400 MHz to 2483 MHz worldwide), and the 900 MHz ISM band (from 902 MHz to 928 MHz in the U.S. and Canada).

ksamples/s: Thousand samples per second

Latency: The amount of end-to-end delay introduced by a DWA system—usually measured in ms (milliseconds)

LFE: Low Frequency Effects—the audio channel in multi-channel audio that is sent to the subwoofer. For example, the "0.1" in Dolby 5.1 refers to the LFE channel.

Lossless: Compression schemes where no information is lost (examples are FLAC, Apple Lossless).

Lossy: Compression schemes where some information is lost (examples are MP3, AAC, Ogvorbis, μLaw, AC3, ADPCM).

Mating: The permanent process of selecting a mating ID which identifies all nodes in the same system.

Measurements of Frequency:
  Hz: Hertz=1 cycle per second
  GHz: GigaHertz=1 billion cycles per second
  kHz: kiloHertz=1,000 cycles per second
  MHz: MegaHertz=1 million cycles per second μLaw (or "mu-law"): A logarithmic sample-wise compression—achieves lossy compression of up to 2 to 1; a time-domain technique.

Multi-channel Compressed Audio: Typically audio streams with more than two channels (e.g., Dolby Digital (AC3), which has five channels of surround audio and one LFE channel).

Multipath Null: Radio signals often travel to a destination by more than one route. If for example there are two routes (one may be a reflection off of some surface), the total travel distance is different for the two paths and so the two copies of the signal will arrive at the destination point with some phase relationship. If they are exactly in phase, they will create a "peak" of signal (constructive interference) known as a multipath peak. If they arrive out of phase, they will create a "null" in signal known as a multipath null (a lack of signal). Dealing with multipath nulls usually involves changing frequency (effectively changes the position of a multipath null) or using two antennas (usually at the receive node) and intelligently picking the best one (the one not in a multipath null) for best performance in real time.

Multipoint (Point to Multipoint): A configuration with one transmit node and multiple receive nodes (or, conversely, multiple transmit nodes and one receive node).

NACK: Not acknowledged (short message sent from receive node to transmit node to inform it that the last packet was NOT received ok).

Nyquist rate: Twice the highest audio frequency in the analog source signal; therefore, if the source is limited to content 20 kHz and below (audible content), the corresponding Nyquist rate is 40 kHz. The Nyquist rate is the lowest sampling rate that can capture all the information in the source signal. The CD standard uses a sampling rate of 44.1 ksamples/s—which is greater than the minimum; 48 ksamples is also a popular sampling rate for digital audio.

Packet Throughput: The percentage of data packets that are successfully transmitted from one system node to another (i.e., packets that arrive uncorrupted or that may be repaired via available error correction mechanisms). Packet throughput varies depending on system performance, environmental conditions, and range.

Path loss: The normal degradation in RF signal experienced by an RF PHY—increases with distance (range), obstacles (especially metallic ones), moisture in the air, etc.; typically measured in dB.

Payload: The data (or data rate) of the actual information that is desired to be transported. Does not include any overheads of framing, checksums, resends or any other overheads that are required to implement RF protocols.

PCBA: Printed Circuit Board Assembly—meaning the combination of a printed circuit board and the components mounted on it.

PHY: Physical layer.

Physical layer ("phy"): In wireless systems the RF layer of the communication solution as implemented by the selected radio frequency transmitter, receiver, or transceivers.

PLL: Phase Locked Loop—in wireless systems, a device in an RF PHY which is used for one radio (receiver) to lock on to and sync up with the transmitted RF signal of another radio (transmitter). PLL lock always takes time—the amount of time varies by radio model. In other systems, a control system which allows one oscillator to match the frequency and phase of another osciallator.

Point to Point: A configuration (topology) with a single transmit node and a single receive node.

Protocol: Predetermined set of rules for how devices will communicate (transfer data from point A to point B). Often this is done with "packets" of data. Often there are special rules about what happens in the case a corrupt packet is received.

QoS: Quality of Service—a term for reliability in wireless systems. In wireless audio systems, good QoS is very important and very difficult to achieve since what is being transported is a real-time signal. Real-time signals are fleeting, thus, the transmit node cannot take whatever time is required to transmit the data—the data must be transferred as a stream to the receive node. Any break in this stream will result in dropouts or crackles/pops in the resulting audio (poor QoS). A reliable stream with no discontinuities is considered good QoS. QoS may be measured quantitatively by placing the wireless system at a fixed range in a predetermined environment and measuring MTBF (i.e., mean time between failures).

RAM: Random Access Memory (volatile memory that is lost on power down); can be read from or written to.

RF: Radio Frequency.

RF Band: The range of frequencies usedby a wireless system. For DWA applications, typically ISM bands are used.

ROM: Read Only Memory—permanent memory that is retained even when power is removed; can be read from but not written to.

Rx: Receive, or receiver, or receive node.

Sample Time: Sample period, which equals the reciprocal of the sample rate. For example, the sample time of a 48 ksample/second audio signal is ($1/48,000$) seconds=20.83 microseconds.

Scouting: The assessment of RF channel performance by speculatively passing low-importance data through the frequency and recording throughput statistics. Can also be done by listening only, although this method has the disadvantage that the channel is not actually tested. Listening methods are superior from a coexistence perspective, however, since the system does not transmit any RF energy, thereby one the whole, allowing more devices to coexist in the band concurrently.

Active Scouting: Scouting by sending data (dummy packets or duplicate packets)

Passive Scouting: Scouting by just tuning into an RF channel and listening for RF energy there.

Simplex: Communication in one direction only.

Time-domain Technique: Algorithms operating on a stream of audio samples in the time domain (i.e., without applying a fourier transform to the data).

Transceiver: Radio device that can act as both a radio transmitter and a radio receiver—typically implemented on a single integrated circuit (chip). Typically radio transceivers can only do one function at a time (transmit or receive) since the two functions usually share some internal hardware for efficiency's sake. See Half Duplex.

Tx: Transmit, or transmitter, or transmit node

Unintentional RF Radiator: Many electronic devices produce RF signals unintentionally. One example is a microwave oven that spills much RF energy into the 2.4 GHz ISM band.

Varactor: An example of an electronic component that changes its capacitance with a change in applied voltage. A varactor is a component that may be used to implement a voltage-controlled oscillator.

Voltage-Controlled Oscillator: An oscillator, the frequency of which is controlled by the value of an applied DC control voltage.

What is claimed is:

1. A system for wireless transmission of audio signals, said system comprising a single transmit node and one or more receive nodes, wherein:
   (a) the transmit node comprises one or more radio frequency transceivers adapted to send one or more audio signals in digital form;
   (b) each receive node comprises a radio frequency transceiver adapted to receive digital audio signals from the transmit node;
   (c) the transmit node is adapted to retransmit previously sent audio data in response to a request from a receive node;
   (d) each of the transmit node and the receive nodes incorporate a single hardware-multithreaded processor having eight or more hardware threads, said processor being adapted to implement baseband functions, protocol functions, error correction functions, and audio processing functions in parallel on each node;
   (e) end-to-end audio signal latency may be preset to a desired value, and will remain substantially equal to the preset value during and between operational sessions;
   (f) two or more processors run software which implements a duplex control channel between the transmit node and one or more of the receive nodes, thereby enabling meta data to be sent on the same physical radio medium that transports the audio signal; and
   (g) said duplex control channel is used to transport control information which has been received by an optical receiver at the receive node and which is rebroadcast by an optical transmitter at the transmit node.

2. A system as in claim 1 wherein the processor of the transmit node implements one or more audio compression operations in parallel, and the processor of each receive node implements one or more audio decompression operations in parallel, and wherein said compression and decompression operations are executed in software on one or more processor threads.

3. A system as in claim 1 wherein each processor is adapted to implement real-time pipeline processing of incoming and outgoing packets by:
   (a) beginning to process a given incoming packet before the entire packet has arrived; and
   (b) beginning to transmit a given outgoing packet before the entire packet has been constructed.

4. A system as in claim 1 wherein the end-to-end audio signal latency does not exceed approximately 100 milliseconds.

5. A system as in claim 1 wherein the processor of each node is adapted to implement a clock synchronization function which controls means for increasing or decreasing the audio clock frequency on said node such that it is synchronized with the audio clock frequency of a selected other system node.

6. A system as in claim 5 wherein the means for increasing or decreasing audio clock frequency comprises a voltage-controlled oscillator.

7. A system as in claim 1 wherein:
   (a) each processor is adapted to implement system software on one or more of its threads and to implement application software on one or more different threads;
   (b) the interface between the system software and application software is an application programming interface;
   (c) the system software may be modified to support different radio frequency transceivers and other I/O components, without requiring modifications to the application software, and
   (d) the application software may be modified without entailing modification of the system software.

8. A system as in claim 1 wherein:
   (a) the processor in the transmit node engages two or more baseband units, enabling said processor to drive one or more radio frequency transceivers; and
   (b) the baseband units and the transmit node processor are implemented on a common semiconductor die.

9. A system as in claim 1, having two or more receive nodes adapted to receive identical audio signals from the transmit node.

10. A system as in claim 1, having two or more receive nodes adapted to receive different audio signals from the transmit node.

11. A system as in claim 1, having two or more receive nodes adapted to receive a combination of identical and different audio signals from the transmit node.

12. A system as in claim 1 wherein each processor has the ability to shut down any combination of its threads, input and output blocks, baseband units, and radio frequency transceivers with which it is engaged, for a selected period of time.

13. A system as in claim 1 wherein the processor engages, on a common semiconductor die, one or more baseband units and an equal number of radio frequency transceivers.

14. A system as in claim 1 wherein the transmit node and receive node are adapted to support duplex audio channels.

15. A system for wireless transmission of audio signals, said system comprising a single transmit node and one or more receive nodes, wherein:
   (a) the transmit node comprises one or more radio frequency transceivers adapted to send one or more audio signals in digital form;
   (b) each receive node comprises a radio frequency transceiver adapted to receive digital audio signals from the transmit node;
   (c) each receive node can send requests back to the transmit node requesting retransmission of audio signal packets that have arrived at the receive node in a corrupted state;
   (d) the transmit node is adapted to compress all audio signals to a desired level prior to transmission or retransmission using time-domain techniques;

(e) a duplex control channel is implemented between the transmit node and one or more of the receive nodes, thereby enabling meta data to be sent on the same physical radio medium that transports the audio data;

(f) the system is adapted to concurrently support closed-loop receive nodes and open-loop receive nodes in any combination;

(g) the system is further adapted such that:

g.1 during periods when a node is required neither to transmit nor to receive data, the node will listen for non-system RF signals from other devices operating in the same frequency band; and g.2 upon detecting a non-system signal, the system will implement an avoidance reaction to avoid interference with the detected non-system signal;

(h) the system is further adapted to classify detected non-system signals according to the type of non-system devices originating the non-system signals;

(i) the specific avoidance reaction in response to a detected non-system signal is dependent on the classification thereof, in accordance with a selected avoidance protocol; and (j) the system is further adapted to classify non-system signals according to whether:

j.1 the associated non-system device would or would not benefit from an avoidance reaction; and j.2 the system would or would not benefit from an avoidance reaction.

16. A system as in claim 15, adapted such that retransmitted data will be compressed to a different extent different than when originally transmitted.

17. A system as in claim 15 wherein each receive node is adapted:

(a) to output, as an audio signal, only audio packets that are tagged by the transmit node as being specifically destined for that receive node; and (b) to make retransmission requests to the transmit node, in cases where corrupted packets are received, only with respect to packets tagged by the transmit node as being specifically destined for that receive node.

18. A system as in claim 15 wherein the transmit node incorporates multiple radio frequency transceivers and each receive node incorporates a single radio frequency transceiver.

19. A system as in claim 15 wherein the transmit node and the receive nodes are each implemented in the form of a wireless audio module, and wherein:

(a) each module comprises a processor PCBA containing the corresponding node's processor and audio signal circuitry, and a radio PCBA containing the corresponding node's radio frequency circuitry;

(b) the processor PCBA and the radio PCBA of each module may be tested independently of one another;

(c) the processor PCBA and the radio PCBA of each module are electrically interconnected via a first electrical interface; and (d) each module interfaces with a motherboard via a second electrical interface located on the associated processor PCBA.

20. A system as in claim 15 wherein:

(a) the audio data sent to all receive nodes is encoded as a single data stream in a multi-channel compressed audio format; and (b) each receive node is adapted to decode the data stream so as to extract and output only the audio channel or channels specifically destined for that node.

21. A system as in claim 15, adapted such that the transmit node can, upon request from a receive node, retransmit data packets to one or more receive nodes, with the retransmitted packets having stronger error correction than as originally sent.

22. A system as in claim 15 wherein the avoidance reaction is to delay transmission of system signals until detected non-system signals have finished transmitting.

23. A system as in claim 15 wherein the avoidance reaction is to change the transmit frequency of system signals.

24. A system as in claim 15, further adapted to configure audio data into a compressed base layer and one or more enhancement layers.

25. A system for wireless transmission of audio signals, said system comprising a single transmit node and one or more receive nodes, wherein:

(a) the transmit node comprises one or more radio frequency transceivers adapted to send one or more audio signals in digital form;

(b) each receive node comprises a radio frequency transceiver adapted to receive digital audio signals from the transmit node;

(c) each receive node can send requests back to the transmit node requesting retransmission of audio signal packets that have arrived at the receive node in a corrupted state;

(d) the transmit node is adapted to compress all audio signals to a desired level prior to transmission or retransmission using time-domain techniques;

(e) a duplex control channel is implemented between the transmit node and one or more of the receive nodes, thereby enabling meta data to be sent on the same physical radio medium that transports the audio data;

(f) the system is adapted to concurrently support closed-loop receive nodes and open-loop receive nodes in any combination;

said system further comprising means for selectively adjusting the size of each receive node's data buffer in order to balance system latency with susceptibility to interference from non-system signals.

26. A system as in claim 25, further adapted to adjust the buffer size on the basis of actual system performance in prevailing environmental conditions.

27. A system as in claim 26, wherein at least one of the receive nodes is adapted to execute a soft mute if the node's buffer empties.

28. A system as in claim 15, wherein the system end-to-end audio signal latency is selected such that it substantially matches the latency of the video generation subsystem of a selected home theater system.

29. A system as in claim 28 wherein:

(a) the home theater system includes one or more wired audio channels; and (b) either digital or analog delay lines are introduced into each wired audio channel such that its latency substantially matches that of the video generation subsystem.

30. A system as in claim 29, wherein the system is used in conjunction with one or more additional wired audio channels to form a hybrid wired and wireless audio system where the wired audio channels incorporate analog or digital delay lines such that the end-to-end audio signal delay of the wired channels matches that of the system.

31. A system as in claim 15 having two or more receive nodes, wherein one or more but not all of the receive nodes operate in active mode and the remaining one or more receive nodes operate in passive mode.

32. A system for wireless transmission of audio signals, said system comprising a single transmit node and two or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) each receive node can send requests back to the transmit node requesting retransmission of audio signal packets that have arrived at the receive node in a corrupted state;
(d) the transmit node is adapted to compress all audio signals to a desired level prior to transmission or retransmission using time-domain techniques;
(e) a duplex control channel is implemented between the transmit node and one or more of the receive nodes, thereby enabling meta data to be sent on the same physical radio medium that transports the audio data;
(f) the system is adapted to concurrently support closed-loop receive nodes and open-loop receive nodes in any combination; and
(g) the system is further adapted such that:
g.1 each receive node, upon being powered up, will bond with a selected transmit node; and
g.2 each receive node comprises bond rejection means which may be activated to reject the bond with the selected transmit node and to cause the receive node to bond to the next available transmit node, thus enabling a user to select a desired audio source.

33. A system as in claim 15, adapted such that:
(a) the transmit node can transmit multiple audio data packets in succession, each packet incorporating a unique checksum, without receiving individual associated ACKs; and
(b) the receive node can send back to the transmit node one or more packets, each containing an identical vector ACK, on one or more frequencies, and with stronger error correction applied to the vector ACK than is applied to normal packets.

34. A system as in claim 15, adapted such that each receive node:
(a) will not send an ACK when a packet is received successfully; and
(b) will send a NACK only when a packet is not received.

35. A system as in claim 15, adapted such that:
(a) no receive node will send a NACK when a packet resend is necessary; and
(b) the transmit node will recognize the lack of an ACK as equivalent to a NACK.

36. A system as in claim 15 wherein two or more sources of audio signal are engaged with the transmit node, and the duplex control channel enables a user at a receive node to control the selection of audio signals transmitted by the transmit node.

37. A system as in claim 15 wherein the duplex control channel enables a user at a selected receive node to view descriptive information about the audio content on a display incorporated into the selected receive node.

38. A system for wireless transmission of audio signals, said system comprising a single transmit node and two or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) each receive node can send requests back to the transmit node requesting retransmission of audio signal packets that have arrived at the receive node in a corrupted state;
(d) the transmit node is adapted to compress all audio signals to a desired level prior to transmission or retransmission using time-domain techniques;
(e) a duplex control channel is implemented between the transmit node and one or more of the receive nodes, thereby enabling meta data to be sent on the same physical radio medium that transports the audio data;
(f) the system is adapted to concurrently support closed-loop receive nodes and open-loop receive nodes in any combination; and
(g) the duplex control channel enables a user at a selected receive node to control the volume at one or more of the receive nodes, the user having set the volume level in a register at the transmit node which then sends the volume information to each receive node.

39. A system for wireless transmission of audio signals, said system comprising a single transmit node and two or more receive nodes, wherein:
(a) the transmit node comprises one or more radio frequency transceivers adapted to send one or more audio signals in digital form;
(b) each receive node comprises a radio frequency transceiver adapted to receive digital audio signals from the transmit node;
(c) each receive node can send requests back to the transmit node requesting retransmission of audio signal packets that have arrived at the receive node in a corrupted state;
(d) the transmit node is adapted to compress all audio signals to a desired level prior to transmission or retransmission using time-domain techniques;
(e) a duplex control channel is implemented between the transmit node and one or more of the receive nodes, thereby enabling meta data to be sent on the same physical radio medium that transports the audio data
(f) the system is adapted to concurrently support closed-loop receive nodes and open-loop receive nodes in any combination;
(g) the system is adapted to implement an adaptive frequency-hopping technique;
(h) the system stores a primary palette of multiple primary frequencies and a secondary palette of multiple secondary frequencies;
(i) primary frequencies are identified by the system as superior-throughput performing frequencies and are used by the system for sending first copies of packets and copies of packets resulting from retransmission requests;
(j) secondary frequencies are identified by the system as second-tier throughput performing frequencies and are used by the system for concurrent scouting of frequencies and transmission of redundant packets;
(k) the frequencies in the secondary palette of are changed on a regular basis to facilitate the system collecting throughput statistics on a maximum number of frequencies in the band;
(l) the system collects and records packet throughput statistics on all primary and secondary frequencies;
(m) when a particular secondary frequency is found over a selected sample period to have a higher average throughput than the primary frequency having the lowest average throughput over the sample period, that secondary frequency is added to the primary palette, and the primary frequency having the lowest average throughput is dropped from the primary palette and moved to the secondary palette;

(n) the system hops on a combined palette comprising both the primary palette and secondary palette; and (o) each packet is transmitted two or more times, without a retransmission request.

40. A system as in claim 39, further adapted to configure audio data into a compressed base layer and one or more enhancement layers, and wherein base layer packets are sent on primary frequencies and enhancement layer packets are sent on secondary frequencies.

41. A system for wireless transmission of audio signals, said system comprising a single transmit node and two or more receive nodes, wherein:

(a) the transmit node comprises one or more radio frequency transceivers adapted to send one or more audio signals in digital form;

(b) each receive node comprises a radio frequency transceiver adapted to receive digital audio signals from the transmit node;

(c) each receive node can send requests back to the transmit node requesting retransmission of audio signal packets that have arrived at the receive node in a corrupted state;

(d) the transmit node is adapted to compress all audio signals to a desired level prior to transmission or retransmission using time-domain techniques;

(e) a duplex control channel is implemented between the transmit node and one or more of the receive nodes, thereby enabling meta data to be sent on the same physical radio medium that transports the audio data (f) the system is adapted to concurrently support closed-loop receive nodes and open-loop receive nodes in any combination;

(g) the transmit node and receive node each hold a predefined dummy packet;

(h) the system is adapted to scout RF channels during free time by sending dummy packets on said RF channels; and (i) the receive node is adapted to collect bit-level RF channel performance statistics on the performance of the channel.

42. A system as in claim 25, adapted such that retransmitted data will be compressed to a different extent different than when originally transmitted.

43. A system as in claim 25 wherein each receive node is adapted:

(a) to output, as an audio signal, only audio packets that are tagged by the transmit node as being specifically destined for that receive node; and (b) to make retransmission requests to the transmit node, in cases where corrupted packets are received, only with respect to packets tagged by the transmit node as being specifically destined for that receive node.

44. A system as in claim 25 wherein the transmit node incorporates multiple radio frequency transceivers and each receive node incorporates a single radio frequency transceiver.

45. A system as in claim 25 wherein the transmit node and the receive nodes are each implemented in the form of a wireless audio module, and wherein:

(a) each module comprises a processor PCBA containing the corresponding node's processor and audio signal circuitry, and a radio PCBA containing the corresponding node's radio frequency circuitry;

(b) the processor PCBA and the radio PCBA of each module may be tested independently of one another;

(c) the processor PCBA and the radio PCBA of each module are electrically interconnected via a first electrical interface; and (d) each module interfaces with a motherboard via a second electrical interface located on the associated processor PCBA.

46. A system as in claim 25 wherein:

(a) the audio data sent to all receive nodes is encoded as a single data stream in a multi-channel compressed audio format; and (b) each receive node is adapted to decode the data stream so as to extract and output only the audio channel or channels specifically destined for that node.

47. A system as in claim 25, adapted such that the transmit node can, upon request from a receive node, retransmit data packets to one or more receive nodes, with the retransmitted packets having stronger error correction than as originally sent.

48. A system as in claim 25, further adapted to configure audio data into a compressed base layer and one or more enhancement layers.

49. A system as in claim 25 wherein the system end-to-end audio signal latency is selected such that it substantially matches the latency of the video generation subsystem of a selected home theater system.

50. A system as in claim 25 having two or more receive nodes, wherein one or more but not all of the receive nodes operate in active mode and the remaining one or more receive nodes operate in passive mode.

51. A system as in claim 25, adapted such that:

(a) the transmit node can transmit multiple audio data packets in succession, each packet incorporating a unique checksum, without receiving individual associated ACKs; and (b) the receive node can send back to the transmit node one or more packets, each containing an identical vector ACK, on one or more frequencies, and with stronger error correction applied to the vector ACK than is applied to normal packets.

52. A system as in claim 25, adapted such that each receive node:

(a) will not send an ACK when a packet is received successfully; and (b) will send a NACK only when a packet is not received.

53. A system as in claim 25, adapted such that:

(a) no receive node will send a NACK when a packet resend is necessary; and (b) the transmit node will recognize the lack of an ACK as equivalent to a NACK.

54. A system as in claim 25 wherein two or more sources of audio signal are engaged with the transmit node, and the duplex control channel enables a user at a receive node to control the selection of audio signals transmitted by the transmit node.

55. A system as in claim 25 wherein the duplex control channel enables a user at a selected receive node to view descriptive information about the audio content on a display incorporated into the selected receive node.

* * * * *